(12) United States Patent
Karabinis

(10) Patent No.: US 7,751,823 B2
(45) Date of Patent: Jul. 6, 2010

(54) SYSTEMS AND METHODS FOR CONTROLLING A LEVEL OF INTERFERENCE TO A WIRELESS RECEIVER RESPONSIVE TO AN ACTIVITY FACTOR ASSOCIATED WITH A WIRELESS TRANSMITTER

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 800 days.

(21) Appl. No.: 11/679,480

(22) Filed: Feb. 27, 2007

(65) Prior Publication Data

US 2008/0032671 A1 Feb. 7, 2008

Related U.S. Application Data

(60) Provisional application No. 60/744,775, filed on Apr. 13, 2006, provisional application No. 60/800,815, filed on May 16, 2006.

(51) Int. Cl.
*H04W 72/00* (2009.01)
(52) U.S. Cl. .................. 455/450; 455/464; 455/509
(58) Field of Classification Search .............. 455/450
See application file for complete search history.

(56) References Cited

U.S. PATENT DOCUMENTS

| | | | |
|---|---|---|---|
| 3,983,530 A * | 9/1976 | Johannessen | 367/13 |
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,524,281 A * | 6/1996 | Bradley et al. | 455/67.15 |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Duc Nguyen
*Assistant Examiner*—Hai V Nguyen
(74) *Attorney, Agent, or Firm*—Myers Bigel Sibley & Sajovec, P.A.

(57) ABSTRACT

A level of interference to a wireless receiver may be controlled by determining a set of frequencies to be assigned to a wireless transmitter, responsive to an activity factor associated with the wireless transmitter, other than a transmission power level of the wireless transmitter. The set of frequencies is then assigned to the wireless transmitter. Related systems, methods and devices are also described.

56 Claims, 8 Drawing Sheets

U.S. PATENT DOCUMENTS

| | | | |
|---|---|---|---|
| 5,631,898 | A | 5/1997 | Dent |
| 5,732,076 | A * | 3/1998 | Ketseoglou et al. ......... 370/347 |
| 5,761,605 | A | 6/1998 | Tawil et al. |
| 5,765,098 | A | 6/1998 | Bella |
| 5,812,947 | A | 9/1998 | Dent |
| 5,832,379 | A | 11/1998 | Mallinckrodt |
| 5,835,857 | A | 11/1998 | Otten |
| 5,848,060 | A | 12/1998 | Dent |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,130,886 | A * | 10/2000 | Ketseoglou et al. ......... 370/347 |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman et al. |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,954,439 | B2 * | 10/2005 | Pulkkinen et al. ........... 370/280 |
| 6,975,837 | B1 | 12/2005 | Santoru |
| 6,999,720 | B2 | 2/2006 | Karabinis |
| 7,006,789 | B2 | 2/2006 | Karabinis et al. |
| 7,031,702 | B2 | 4/2006 | Karabinis et al. |
| 7,039,400 | B2 | 5/2006 | Karabinis et al. |
| 7,062,267 | B2 | 6/2006 | Karabinis |
| 7,076,213 | B2 * | 7/2006 | Lee ........................ 455/67.14 |
| 7,092,708 | B2 | 8/2006 | Karabinis |
| 7,113,743 | B2 | 9/2006 | Karabinis |
| 7,113,778 | B2 | 9/2006 | Karabinis |
| 7,155,216 | B2 * | 12/2006 | Kiukkonen et al. ......... 455/423 |
| 7,174,127 | B2 | 2/2007 | Otten et al. |
| 7,181,161 | B2 | 2/2007 | Karabinis |
| 7,593,691 | B2 * | 9/2009 | Karabinis .................. 455/63.1 |
| 7,606,524 | B1 * | 10/2009 | Frank ............................ 455/1 |
| 2001/0014083 | A1 * | 8/2001 | Pulkkinen et al. ........... 370/280 |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0109284 | A1 * | 6/2003 | Akerberg et al. ............. 455/561 |
| 2003/0149986 | A1 | 8/2003 | Mayfield et al. |
| 2003/0153308 | A1 | 8/2003 | Karabinis |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1 | 7/2004 | Churan |
| 2004/0157561 | A1 * | 8/2004 | Akerberg .................. 455/67.11 |
| 2004/0192200 | A1 | 9/2004 | Karabinis |
| 2004/0192395 | A1 | 9/2004 | Karabinis |
| 2004/0203393 | A1 | 10/2004 | Chen |
| 2004/0240525 | A1 | 12/2004 | Karabinis et al. |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0079816 | A1 | 4/2005 | Karabinis et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260948 | A1 * | 11/2005 | Regulinski et al. ......... 455/12.1 |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0272432 | A1 | 12/2005 | Ji et al. |
| 2005/0282542 | A1 | 12/2005 | Karabinis |
| 2005/0282570 | A1 * | 12/2005 | Pulkkinen et al. ........... 455/502 |
| 2005/0288011 | A1 | 12/2005 | Dutta |
| 2006/0002323 | A1 * | 1/2006 | Hildebrand et al. ......... 370/321 |
| 2006/0040613 | A1 | 2/2006 | Karabinis et al. |
| 2006/0040657 | A1 | 2/2006 | Karabinis et al. |
| 2006/0040659 | A1 | 2/2006 | Karabinis |
| 2006/0063485 | A1 * | 3/2006 | Gainey et al. ................. 455/15 |
| 2006/0094352 | A1 | 5/2006 | Karabinis |
| 2006/0094420 | A1 | 5/2006 | Karabinis |
| 2006/0105707 | A1 | 5/2006 | Karabinis |
| 2006/0111041 | A1 | 5/2006 | Karabinis |
| 2006/0111056 | A1 | 5/2006 | Dutta |
| 2006/0135058 | A1 | 6/2006 | Karabinis |
| 2006/0135060 | A1 | 6/2006 | Karabinis |
| 2006/0135070 | A1 | 6/2006 | Karabinis |
| 2006/0165120 | A1 | 7/2006 | Karabinis |
| 2006/0171345 | A1 * | 8/2006 | Hildebrand et al. ......... 370/319 |
| 2006/0189274 | A1 | 8/2006 | Karabinis |
| 2006/0189275 | A1 | 8/2006 | Karabinis |
| 2006/0189309 | A1 | 8/2006 | Good et al. |
| 2006/0194576 | A1 | 8/2006 | Karabinis et al. |
| 2006/0205346 | A1 | 9/2006 | Evans et al. |
| 2006/0205347 | A1 | 9/2006 | Karabinis |
| 2006/0205367 | A1 | 9/2006 | Karabinis |
| 2006/0211371 | A1 | 9/2006 | Karabinis et al. |
| 2006/0211419 | A1 | 9/2006 | Karabinis |
| 2006/0211452 | A1 | 9/2006 | Karabinis |
| 2006/0217070 | A1 | 9/2006 | Karabinis |

| | | | |
|---|---|---|---|
| 2006/0232465 A1 | 10/2006 | Levin et al. | |
| 2006/0233147 A1 | 10/2006 | Karabinis | |
| 2006/0246838 A1 | 11/2006 | Karabinis | |
| 2006/0252368 A1 | 11/2006 | Karabinis | |
| 2006/0276129 A1 | 12/2006 | Karabinis | |
| 2006/0292990 A1* | 12/2006 | Karabinis et al. | 455/63.4 |
| 2007/0010246 A1 | 1/2007 | Churan | |
| 2007/0015460 A1 | 1/2007 | Karabinis et al. | |
| 2007/0021059 A1 | 1/2007 | Karabinis et al. | |
| 2007/0021060 A1 | 1/2007 | Karabinis et al. | |
| 2007/0026867 A1 | 2/2007 | Karabinis | |
| 2007/0173260 A1* | 7/2007 | Love et al. | 455/450 |
| 2007/0173276 A1* | 7/2007 | Love et al. | 455/522 |
| 2007/0286156 A1* | 12/2007 | Gormley et al. | 370/350 |
| 2008/0009305 A1* | 1/2008 | Li et al. | 455/522 |
| 2008/0014861 A1* | 1/2008 | Li et al. | 455/3.01 |
| 2008/0025254 A1* | 1/2008 | Love et al. | 370/329 |
| 2008/0032671 A1* | 2/2008 | Karabinis | 455/412.1 |
| 2008/0101264 A1* | 5/2008 | Li et al. | 370/310 |
| 2008/0101447 A1* | 5/2008 | Li et al. | 375/222 |
| 2009/0286501 A1* | 11/2009 | Rousu et al. | 455/323 |
| 2010/0008268 A1* | 1/2010 | Whinnett et al. | 370/295 |
| 2010/0081449 A1* | 4/2010 | Chaudhri et al. | 455/452.2 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 99/51045 A1 | 10/1999 |
| WO | WO 00/49830 A1 | 8/2000 |
| WO | WO 00/76086 A1 | 12/2000 |
| WO | WO 01/54314 A1 | 7/2001 |

OTHER PUBLICATIONS

Ayyagari et al., "A satellite-augmented cellular network concept", *Wireless Networks* Vo. 4, 1998, pp. 189-198.

Notification of Transmittal of the International Search Report and the Written Opinion of the International Searching Authority, or the Declaration, International Search Report, and Written Opinion of the International Searching Authority, PCT/US2007/005482, Sep. 24, 2007.

\* cited by examiner

SYSTEMS AND METHODS FOR CONTROLLING A LEVEL OF INTERFERENCE TO A WIRELESS RECEIVER RESPONSIVE TO AN ACTIVITY FACTOR ASSOCIATED WITH A WIRELESS TRANSMITTER

CROSS-REFERENCE TO RELATED APPLICATIONS

This application claims the benefit of Provisional Application No. 60/744,775, filed Apr. 13, 2006, entitled Systems and Methods for Controlling Transmission Frequencies of Outdoor Radioterminals to Reduce Potential Interference With Other Outdoor Radioterminals and Provisional Application No. 60/800,815, filed May 16, 2006, entitled Systems and Methods for Controlling Transmission Frequencies of Radioterminals to Reduce Potential Interference With Other Radioterminals, assigned to the assignee of the present invention, the disclosures of which are hereby incorporated hereby by reference in their entirety as if set forth fully herein.

FIELD OF THE INVENTION

This invention relates to wireless communications systems, methods and components thereof and more particularly to satellite and terrestrial wireless communications systems, methods and components thereof.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," a "wireless transmitter," a "wireless receiver," a "transceiver" or simply as a "terminal". As used herein, the term(s) "radioterminal," "radiotelephone," "mobile terminal," "user device," "wireless transmitter," "wireless receiver," "transceiver" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. Nos. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. patent application Ser. Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

Many of the above-cited patents and publications can reduce or eliminate intra-system interference that is caused by terrestrial use and/or reuse of satellite frequencies by an ancillary terrestrial network. However, inter-system interference also can be caused by terrestrial use and/or reuse of satellite frequencies by an ancillary terrestrial network and/or radioterminals communicating therewith, due to, for example, the potential production of out-of-band and/or out-of-channel emissions by a radioterminal that is transmitting over a satellite frequency band.

SUMMARY OF THE INVENTION

A level of interference to a wireless receiver may be controlled, according to some embodiments of the present invention, by determining a set of frequencies to be assigned to a wireless transmitter responsive to an activity factor associated with the wireless transmitter other than a transmission power level of the wireless transmitter. The set of frequencies is then assigned to the wireless transmitter.

In some embodiments, determining a set of frequencies comprises establishing a frequency distance between the set of frequencies and a band of frequencies used for reception by the wireless receiver responsive to the activity factor associated with the wireless transmitter other than the transmission power level of the wireless transmitter. In other embodiments, establishing a frequency distance comprises constraining the set of frequencies at a frequency distance from the edge of a carrier used by the wireless transmitter responsive to the activity factor associated with the wireless transmitter other than the transmission power level of the wireless transmitter. In still other embodiments, the set of frequencies is constrained at a frequency distance from the band of frequencies used for reception by the wireless receiver responsive to the activity factor associated with the wireless transmitter other than the transmission power level of the wireless transmitter.

In some embodiments, the wireless receiver is a wireless transceiver that is operative in a Frequency Division Duplex (FDD) mode using a downlink band of frequencies and an uplink band of frequencies, and the set of frequencies is constrained to be proximate to the uplink band of frequencies and distant from the downlink band of frequencies. In other embodiments, the wireless transmitter is operative in a Time Division Duplex (TDD) mode.

In still other embodiments, the set of frequencies to be assigned to the wireless transmitter is determined by increasing a frequency distance between the set of frequencies and a band of frequencies used for reception by the wireless receiver as the activity factor increases. In other embodiments, a frequency distance between the set of frequencies and a band of frequencies used for reception by the wireless receiver is decreased as the activity factor decreases. In yet other embodiments, determining a set of frequencies is further responsive to the wireless transmitter operating indoors or outdoors.

In some embodiments, the set of frequencies is included in a satellite frequency band and, in some embodiments, the satellite frequency band is an L-band, S-band, big/little LEO/MEO-band and/or any other band used to provide space-based communications. Moreover, in some embodiments, the band of frequencies used for reception by the wireless receiver is also included in the satellite frequency band, wherein the satellite frequency band is, in some embodiments, an L-band, S-band, big/little LEO/MEO-band and/or any other band used to provide space-based communications.

In still other embodiments of the present invention, the activity factor itself is determined. In some embodiments, the activity factor comprises a bandwidth. In other embodiments, the activity factor comprises a duty factor. In yet other embodiments, determining is further responsive to detecting a signal from the wireless transceiver, and the detecting may be performed by a base station serving the wireless transceiver.

In still other embodiments of the invention, determining the set of frequencies to be assigned to the wireless transmitter is further responsive to a geographic location of the wireless transmitter. In some embodiments, the geographic location may comprise an identification of a base station that is serving the wireless transmitter. In other embodiments, the geographic location may comprise a distance of the wireless transmitter relative to a geographic feature. The geographic feature may comprise a body of water, an airport and/or an area that is designated as a helicopter landing pad.

In still other embodiments, determining a set of frequencies to be assigned to a wireless transmitter is performed repeatedly. In yet other embodiments, determining a set of frequencies to be assigned to a wireless transmitter may be further responsive to establishing that the wireless receiver is proximate to the wireless transmitter. Proximity may be established by detecting transmission by the wireless receiver at a base station that serves the wireless transmitter. In other embodiments, geographic coordinates associated with the wireless transmitter and the wireless receiver may be compared.

In still other embodiments, determining a set of frequencies to be assigned to the wireless transmitter may be performed independent of whether the wireless receiver is operating. Moreover, in other embodiments, determining the set of frequencies to be assigned to a wireless transmitter may be performed in response to an instruction that is received from a space-based component, an ancillary terrestrial component and/or any other infrastructure component. In some embodiments, determining is performed for each one of a plurality of wireless transmitters, and in other embodiments, determining is performed for a subset of a plurality of wireless transmitters.

Embodiments of the invention have been described above in connection with determining a set of frequencies to be assigned to a wireless transmitter responsive to an activity factor associated with the wireless transmitter other than a transmission power level of the wireless transmitter. However, in any of these embodiments, determining a set of frequencies to be assigned to a wireless transmitter may be responsive to the activity factor associated with the wireless transmitter other than the transmission power level of the wireless transmitter, and may be further responsive to the actual transmission power level of the wireless transmitter.

Embodiments of the present invention have been described above primarily in terms of methods of controlling a level of interference to a wireless receiver. However, other embodiments provide analogous systems for controlling a level of interference to a wireless receiver. These systems may include a controller that is configured to determine a set of frequencies to be assigned to a wireless transmitter responsive to an activity factor associated with the wireless transmitter other than a transmission power level of the wireless transmitter, according to any of the above-described embodiments. The controller may be located at a space-based component, an ancillary terrestrial component or any other infrastructure component of the system. Moreover, still other embodiments of the present invention provide a wireless transmitter itself, that uses the set of frequencies that is assigned thereto responsive to an activity factor associated with the wireless transmitter other than a transmission power level of the wireless transmitter itself. The set of frequencies may be assigned in response to an instruction that is received from a space-based component, an ancillary terrestrial component and/or any other infrastructure component of the system.

In still other embodiments of the present invention, out-of-channel emissions by a first satellite band radioterminal of a first radioterminal system into a second satellite band of a second radioterminal system may be reduced, according to some embodiments of the present invention, by selecting at least one parameter of the first satellite band transmission by the first radioterminal, other than a power level of the first satellite band transmission by the first radioterminal, as a function of the power level of the first satellite band transmission by the first radioterminal and a transmission frequency of the first satellite band transmission by the first radioterminal relative to the second satellite band of the second radioterminal system. In some embodiments, at least one parameter of the first satellite transmission by a first radioterminal, other than a power level of the first satellite band transmission by the first radioterminal, is selected as a function of the power level of the first satellite band transmission by the first radioterminal being sufficiently high, and a transmission frequency of the first satellite band transmission by the first radioterminal being sufficiently close to the second satellite band of the second radioterminal system, so as to produce an undesirable level of out-of-channel emissions by the first radioterminal of the first radioterminal system into the second satellite band of the second satellite radioterminal system.

In some embodiments, the at least one parameter that is selected comprises a transmission frequency of the first satellite band transmission by the first radioterminal. In these embodiments, the transmission frequency of the first satellite band transmission by the first radioterminal is selected to change the size of a guardband between the first satellite band transmission of the first radioterminal and the second satellite band of the second radioterminal system as a function of the power level of the first satellite band transmission by the first radioterminal and the transmission frequency of the first satellite transmission by the first satellite radioterminal relative to the second satellite band of the second radioterminal system. In some embodiments, the first radioterminal operates in Time Division Duplex (TDD) mode, such that the transmission frequency of the first satellite band transmission by the first radioterminal is in a satellite downlink band. In some of these embodiments, the transmission frequency of the first satellite band transmission by the first radioterminal is changed to another frequency in the satellite downlink band, such that the first radioterminal continues to operate in TDD mode, to thereby change the size of the guardband. In still other embodiments, the transmission frequency of the first satellite band transmission by the first radioterminal is changed to a frequency in the satellite uplink band, such that the first radioterminal continues to operate in TDD mode, to thereby change the size of the guardband. In still other embodiments, the transmission frequency of the first satellite band transmission by the first radioterminal is changed to a frequency in the satellite uplink band, such that the first radioterminal no longer operates in TDD mode, to thereby change the size of the guardband.

In still other embodiments, the transmission frequency of the first satellite band transmission by the first transmission terminal is changed to be further away from the second satellite band of the second radioterminal system, to thereby increase the size of the guardband between the first satellite band transmission of the first radioterminal and the second satellite band of the second radioterminal system, as a function of the increase in power level of the first satellite band transmission by the first radioterminal. In other embodiments, the transmission frequency of the first satellite band transmission by the first radioterminal is changed to be closer to the second satellite band of the second radioterminal system, to thereby decrease the size of the guardband between the first satellite band transmission of the first radioterminal and the second satellite band of the second radioterminal system, as a function of the decreasing power level of the first satellite band transmission by the first radioterminal.

In still other embodiments, the power level of the first satellite band transmission by the first radioterminal provides a metric as to whether the first radioterminal is indoors or outdoors. The parameter of the first satellite transmission by the first radioterminal may then be changed based on whether the first radioterminal is indoors or outdoors. In other embodiments, the at least one parameter is changed as a function of the power level of the first satellite band transmission by the first radioterminal and a separate indication that the first radioterminal is outdoors.

In yet other embodiments, a transmission frequency of the first satellite transmission by the first radioterminal is changed, to change the size of the guardband between the first satellite band transmission of the first radioterminal and the second satellite band of the second radioterminal system, as a function of the power level of the first satellite band transmission relative to a threshold. In other embodiments, changes are made as a function of the power level of the first satellite band transmission relative to a plurality of thresholds. In yet other embodiments, the amount of change in the transmission frequency of the first satellite band transmission by the first radioterminal is changed monotonically as a function of the power level of the first satellite band transmission by the first radioterminal.

In still other embodiments of the present invention, the parameter that is changed comprises an activity factor of the first satellite band transmission by the first radioterminal. In some embodiments, the activity factor comprises a bandwidth of the first satellite band transmission by the first radioterminal. In other embodiments, the activity factor comprises a duty factor of the first satellite band transmission by the first radioterminal.

In yet other embodiments, the at least one parameter is changed as a function of the power level of the first satellite band transmission by the first radioterminal and the transmission frequency of the first satellite band transmission by the first radioterminal, and in further response to detection of a signal of a second radioterminal of the second radioterminal system at a base station serving the first radioterminal. In still other embodiments, the at least one parameter comprises a bandwidth, duty factor and/or transmission frequency placement of first satellite band transmission by the first radioterminal as a function of the power level of the first satellite band transmission by the first radioterminal and a transmission frequency of the first satellite band transmission by the first radioterminal relative to the second satellite band of the second radioterminal system.

In still other embodiments, the at least one parameter is changed as a function of the power level of the first satellite band transmission by the first radioterminal, a transmission frequency of the first satellite band transmission by the first radioterminal relative to the second satellite band of the second radioterminal system and a geographic location of the first radioterminal. In some embodiments, the geographic location of the first radioterminal comprises an identification of a base station that is serving the first radioterminal. In other embodiments, the geographic location of the first terminal comprises a geographic location of the first radioterminal relative to at least one terrestrial geographic feature, such as a body of water.

In any of the embodiments described herein, the at least one parameter may be changed repeatedly, to arrive at an optimum value of the at least one parameter. The repeated changes may also use recursive techniques to arrive at an optimum parameter or parameters.

In still other embodiments of the present invention, the at least one parameter is changed in response to determining that a second radioterminal of the second radioterminal system is proximate the first radioterminal. Proximity of the second radioterminal to the first radioterminal may be determined by detecting transmission of the second radioterminal at a base station that serves the first radioterminal, in some embodiments. In other embodiments, proximity may be detected by comparing geographic coordinates of the first and second radioterminals. However, in other embodiments of the present invention, the at least one parameter may be changed independent of whether a second radioterminal of the second radioterminal system is operating in the second satellite band of the second radioterminal system.

Finally, in any of the embodiments described herein, the at least one parameter may be changed by the first radioterminal in response to an instruction that is received from a space-based component, an ancillary terrestrial component and/or another infrastructure component of the first radioterminal system. Moreover, in any of the embodiments described herein, selecting at least one parameter may be performed on all of the first radioterminals of the first radioterminal system. In other embodiments, selecting at least one parameter may be performed only on a subset of the first radioterminals, such as those terminals that are near a body of water or other potentially interfering environment.

Embodiments of the present invention have been described above primarily in terms of methods of reducing out-of-channel emissions by a first satellite band radioterminal of a first radioterminal system into a second satellite band of a second radioterminal system. However, other embodiments provide analogous systems for reducing out-of-channel emissions by a first satellite band radioterminal of a first radioterminal system into a second satellite band of a second radioterminal system. These systems may include a controller that is configured to select at least one parameter of the first satellite band transmission of the first radioterminal, other than a power level of the first satellite band transmission by the first radioterminal, as a function of the power level of the first satellite band transmission by the first radioterminal and the transmission frequency of the first satellite band transmission by the first radioterminal relative to the second satellite band of the second radioterminal system, according to any of the above-described embodiments. The controller may be located in a space-based component, an ancillary terrestrial component and/or another infrastructure component of the first radioterminal system. Moreover, still other embodiments of the present invention provide the first satellite band radioterminal itself that is configured to select at least a parameter of first satellite band transmission thereof, other than a power level of the first satellite band transmission thereof, as a function of the power level of the first satellite band transmission thereof and of a transmission frequency of the first satellite band transmission thereof relative to the second satellite band of the second radioterminal system. The at least one parameter may be selected in response to an instruction that is received from a space-based component, an ancillary terrestrial component and/or another infrastructure component of the first radioterminal system.

DETAILED DESCRIPTION

Figure 1:
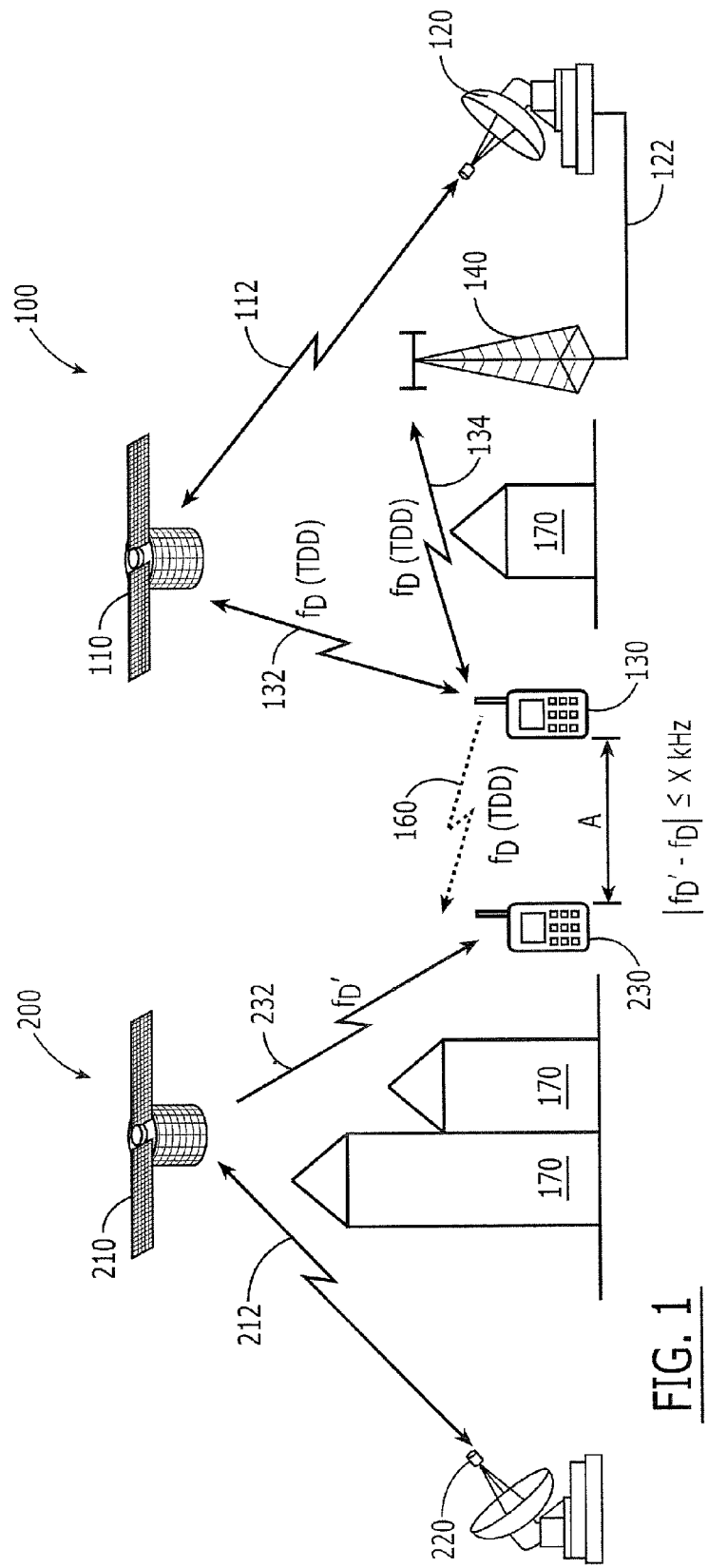
FIG. 1 is a schematic diagram of first and second satellite radioterminal communications systems and methods and the causation of potential interference, according to some embodiments of the present invention.

Specific embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

It should also be noted that in some alternate implementations, the functions/acts noted in the flowchart blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts may be separated into multiple blocks and/or the functionality of two or more blocks of the flowcharts may be at least partially integrated.

Embodiments of the present invention will be described herein in connection with potential interference that may be caused by components of a first wireless communications system (e.g., a first satellite radioterminal communications system) to components of the first and/or a second wireless communications system (e.g., to components of the first and/or a second satellite radioterminal communications system), and solutions to reduce or eliminate this potential interference. In some embodiments, the first satellite radioterminal communications system may be a satellite radioterminal communications system that is operated by Mobile Satellite Ventures, LP ("MSV") and the second satellite radioterminal communications system may be a satellite radioterminal communications system that is operated by Inmarsat, plc ("Inmarsat"). However, other first and second satellite radioterminal communications systems may be provided according to other embodiments of the present invention. It will be understood that two or more embodiments of the present invention as presented herein may be combined in whole or in part to form one or more additional embodiments.

FIG. 1 is a schematic diagram illustrative of first and second satellite radioterminal communications systems/methods and the causation of potential interference according to some embodiments of the present invention. Referring now to FIG. 1, a first satellite radioterminal communications system 100 (also referred to herein as "system 100") includes a space-based component including one or more satellites 110 that communicate with one or more gateways 120 via one or more feeder links 112. An Ancillary Terrestrial Network (ATN) comprising one or more Ancillary Terrestrial Components (ATCs) 140 (also referred to herein as an "ATC base station 140," "ATC 140" or "base station 140") also is provided and may communicate with the gateway 120 and/or other components/elements of the first system 100 using a wired and/or wireless link 122. The ancillary terrestrial component 140 uses and/or reuses one or more satellite frequencies to provide wireless communications to one or more radioterminals 130. At least one first radioterminal 130 communicates with the space-based component 110 and/or with the ancillary terrestrial component 140 using satellite frequencies. In some embodiments, bidirectional communications may take place in a Time Division Duplex (TDD) mode using satellite downlink frequencies $f_D$ over TDD satellite links 132 and/or TDD terrestrial links 134. It will be understood that more than one satellite 110 and/or gateway 120 may be provided and, typically, large numbers of ancillary terrestrial components 140 and first radioterminals 130 may be provided. It will also be understood that, in some embodiments, satellite links 132 may use a Frequency Division Duplex (FDD) protocol and ATC links 134 (e.g., terrestrial links 134) may use a FDD and/or TDD protocol.

Still referring to FIG. 1, a second satellite radioterminal communications system/method 200 (also referred to herein as "system 200") includes a space-based component that includes one or more satellites 210 and one or more gateways 220 that communicate with one another using one or more feeder links 212. The second satellite 210 communicates with at least one radioterminal 230 using a satellite downlink frequency $f_D'$ over at least one satellite downlink 232. The at least one radioterminal 230 may also be configured to communicate with the one or more satellites 210 over at least one satellite uplink (not illustrated). Furthermore, in some embodiments of the present invention, systems 100, 200 may be connected (not illustrated) to thereby exchange information therebetween.

The second radioterminal(s) 230 may be physically proximate to the first radioterminal(s) 130. It will be understood that more than one satellite 210 and/or gateway 220 may be provided and, a large number of second radioterminals 230 may be provided. The second radioterminal(s) 230 may be different compared to the first radioterminal(s) 130, wherein different may comprise a mechanical, electrical and/or functional difference and the two types of radioterminals (230, 130) may be configured to provide communications based upon respective first and second air interfaces that may be different therebetween. In accordance with some embodiments, at least one of the first and second air interfaces may be based upon a terrestrial cellular air interface. In accordance with further embodiments, a TDD air interface and/or a radioterminal 130 may be configured to provide a non-symmetrical communications mode wherein a forward link data rate is greater compared to a return link data rate. In still further embodiments, the ATC 140 may be operatively configured with diversity reception/processing of return link signals, comprising space diversity reception/processing of return link signals and/or polarization diversity reception/processing of return link signals, to thereby increase/maximize a return link margin for radioterminal(s) 130 and thereby reduce an output power requirement and/or Equivalent Isotropic Radiated Power (EIRP) associated with the radioterminal(s) 130.

In some embodiments, a return link margin associated with ATC 140 (i.e., base station 140) is greater than a forward link margin associated with the ATC 140. In further embodiments of the present invention, the ATC 140 comprises a receive antenna aperture and/or receive antenna gain that is greater than a transmit antenna aperture and/or a transmit antenna gain. In additional embodiments, the ATC 140 comprises a transmit antenna that is configured to radiate substantially Left Hand Circularly Polarized (LHCP) electromagnetic energy and a receive antenna that is configured to receive substantially LHCP and/or Right Hand Circularly Polarized (RHCP) electromagnetic energy. In still further embodiments, the transmit and/or receive antennas of an ATC 140 is/are phased array antennas, that may be multi-dimensional phased array antennas, that provide a maximum gain (maximum energy) antenna pattern in a direction (or directions) associated with a desired user device (i.e., terminal) and provide a minimum gain (minimum energy) antenna pattern in one or more other directions associated respectively with one or more other receivers/transmitters, to thereby reduce or eliminate interference to the ATC 140 from the one or more other transmitters and/or reduce or eliminate interference to the one or more other receivers from the ATC 140. A transmit and/or receive antenna(s) of the ATC 140 may, according to some embodiments, be circular phased array antennas. In other embodiments, the ATC 140 may comprise a plurality of sectors with each sector comprising one or more phased array antennas.

Accordingly, FIG. 1 illustrates that a receiver of the second radioterminal 230, also referred to herein as a "sensitive second satellite terminal receiver 230," may receive communications from a space-based component 210 on frequencies $f_D'$ that are close to frequencies $f_D$ used by the MSV system 100. As such, unwanted emissions (i.e., out-of-channel emissions) 160 by the MSV first radioterminal(s) 130 may cause harmful interference to such a sensitive second satellite terminal receiver 230. Specifically, the sensitive second satellite terminal receiver 230 may be receiving information from an Inmarsat satellite 210 using one or more frequencies in a satellite downlink range 232 of, for example, 1525-1559 MHz, while an MSV first radioterminal 130 operating in TDD mode may be transmitting over TDD links 132/134 also using frequencies in the satellite downlink range of 1525-1559 MHz.

As also shown in FIG. 1, the sensitive second satellite terminal receiver 230 and the MSV first radioterminal 130 may be separated from one another by a relatively small distance A, and a frequency separation between the frequencies used by the sensitive second satellite terminal receiver 230 and the frequencies used by the MSV first radioterminal 130 may be relatively small. For example, as shown in FIG. 1, a frequency separation (i.e., frequency distance) between the second radioterminal 230 and the first radioterminal 130 may be less than or equal to X kHz, as shown by the following relationship:

$$|f_D'-f_D| \leq X \text{ kHz}.$$

As such, Out-Of-Channel Emissions (OOCE) by the first radioterminal 130 may cause a level of interference at the sensitive second satellite terminal receiver 230, illustrated by the dashed path 160 in FIG. 1.

It will be understood by those having skill in the art that this potential interference 160 may only occur when the first radioterminal 130 is operating in TDD mode, such that the first radioterminal 130 is transmitting to a satellite 110 and/or to an ancillary terrestrial component 140 using satellite downlink frequencies $f_D$, as shown by respective links 132 and/or 134. In non-TDD mode (i.e., Frequency Division Duplex (FDD) mode), the first radioterminal 130 may transmit to the satellite 110 and/or the ancillary terrestrial component 140 using satellite uplink frequencies that are generally sufficiently separated from the downlink frequencies $f_D'$ of the second satellite radioterminal communications system 200, so as to reduce or preclude potential interference path 160.

Some embodiments of the present invention may arise from recognition that an antenna of the sensitive second satellite radioterminal 230 may be generally situated externally of a building/structure 170 since the antenna may generally require an unobstructed line-of-sight path to the second satellite 210. The first (TDD) radioterminal 130 also may be operating outdoors (or in some other propagation environment conducive to interference with the second radioterminal 230) and may potentially interfere with the sensitive second satellite terminal 230. Moreover, the first satellite radioterminal communications system 100 may have knowledge of whether the first radioterminal 130 is operating outdoors or indoors based on, for example, a closed-loop power control metric. More specifically, based on closed-loop power control principles, which are conventionally used to reduce or minimize a power level that needs to be radiated by a radioterminal, an ancillary terrestrial component 140 and/or a satellite 110 serving the TDD radioterminal 130, can know, at least approximately, at least a measure of an output power level associated with the TDD first radioterminal 130. Even more specifically, in accordance with some embodiments, a TDD first radioterminal 130 operating outdoors and communicating with ATC base station 140 will transmit a power level that is, at least approximately, equal to $P_{MAX}$–SAM; where $P_{MAX}$=maximum output power capability of the TDD terminal (in units of, for example, dBW or dBm) and SAM=Structural Attenuation Margin (in dB) provided by the ATC base station 140 on a return-link 134.

According to some embodiments of the invention, in response to a determination that a first radioterminal 130 is operating outdoors (or in some other potentially conducive to interference propagation environment) and is transmitting in TDD mode using satellite (or non-satellite) downlink frequencies $f_D$ that are sufficiently close to downlink frequencies $f_D'$ of another satellite (or non-satellite) communications system 200, the transmission frequencies of the first radioterminal 130 may be changed, modified, constrained and/or restricted so as to be further away from the downlink frequencies $f_D'$ of the second system 200. According to some embodiments, responsive to the output power of the TDD first radioterminal 130 approaching, being approximately equal to and/or becoming less than $P_{MAX}$–SAM and responsive to the TDD terminal 130 transmitting frequencies $f_D$ comprising a separation (i.e., frequency distance) that is less than X kHz from the frequencies $f_D'$ used by the sensitive second satellite terminal receiver 230, the ATC base station 140 serving the TDD first radioterminal 130 may command the TDD first radioterminal 130 to commence transmitting using frequencies that comprise a separation of at least X kHz from the frequencies used by the sensitive second satellite terminal receiver 230.

Figure 2:
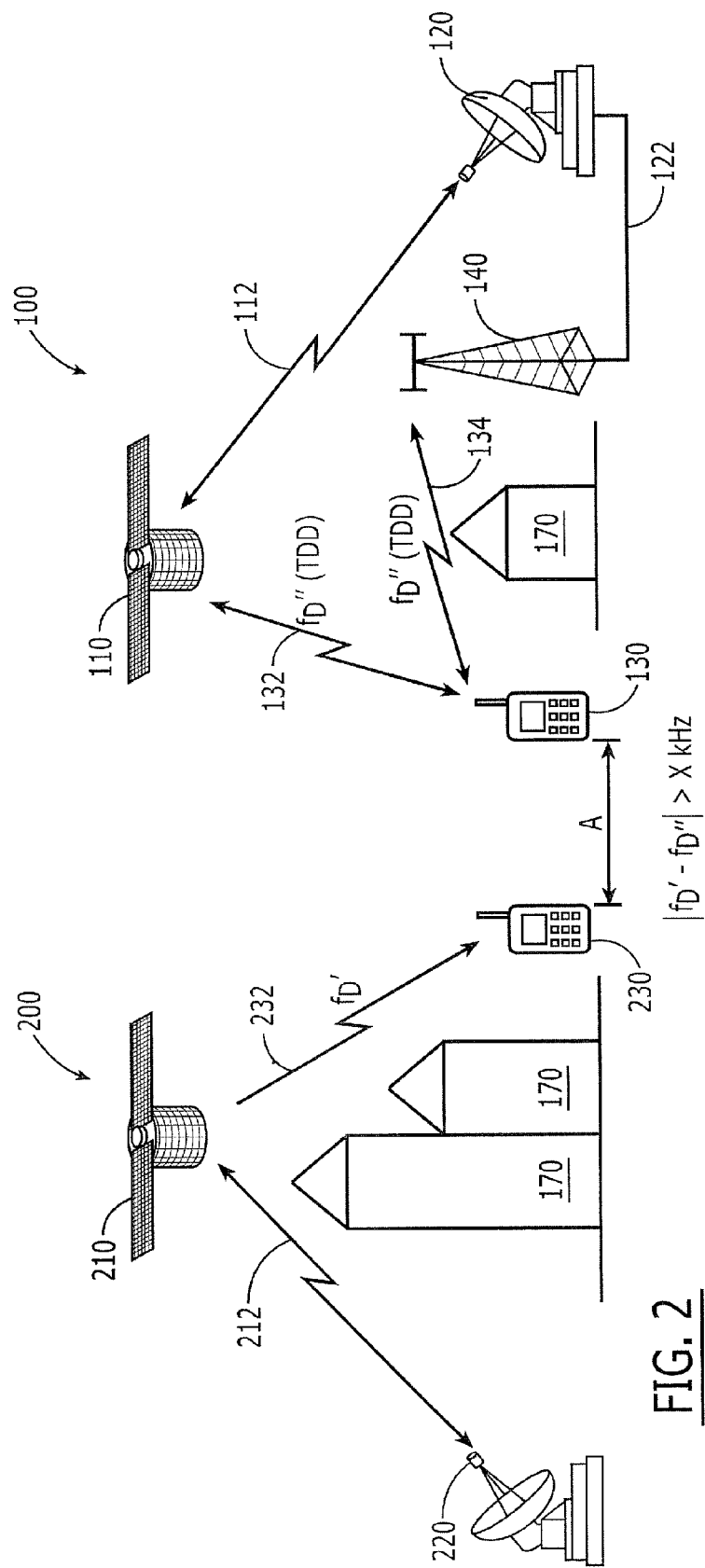
FIGS. 2 and 3 are schematic diagrams of first and second satellite radioterminal communication systems/methods that can reduce potential interference, according to some embodiments of the present invention.

In some embodiments, as illustrated in FIG. 2, X kHz may be approximately 500 kHz and the frequencies $f_D''$ used by the TDD terminal 130 to provide the separation of at least X kHz from the frequencies used by the sensitive second satellite terminal receiver 230 may remain within the satellite downlink range of 1525-1559 MHz. In other words, in embodiments of FIG. 2, TDD mode is still maintained by terminal 130, but a greater separation of radioterminal transmit frequencies relative to frequencies that may be used by radioterminal 230 is provided.

Figure 3:
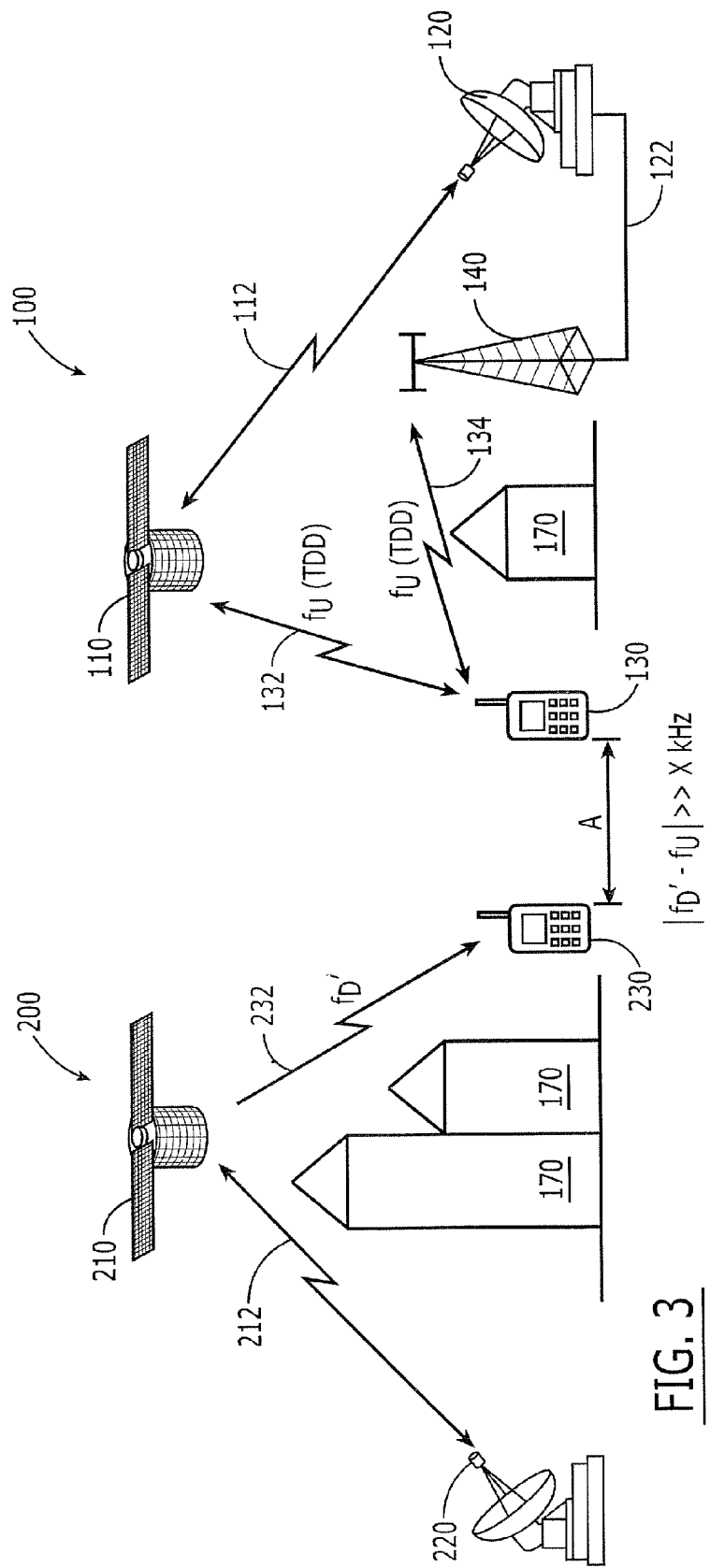

In other embodiments, as illustrated in FIG. 3, providing a separation of at least X kHz between the frequencies used by radioterminal 130 and the frequencies used by the sensitive second satellite terminal receiver 230 may require placing the frequencies used by the TDD first radioterminal 130 within an uplink (i.e., a return link) frequency range (e.g., within a satellite uplink range, such as, 1626.5-1660.5 MHz or within any other range of frequencies). In other words, in embodiments of FIG. 3, the frequencies used by the first TDD radioterminal 130 may be placed within a satellite uplink frequency range $f_U$.

Accordingly, responsive to a detection by a serving ATC base station 140 and/or other system element of system 100 that a TDD first radioterminal 130 is operating outdoors (as evidenced by a measure of output power of the TDD terminal in light of a SAM being provided by the serving ATC base station 140 and/or as evidenced by any other metric such as, for example, position coordinates) and responsive to the frequencies $f_D$ being used by the TDD first radioterminal 130 having a separation that is less than or equal to X kHz from the frequencies $f_D'$ used by the sensitive second satellite terminal receiver 230, the serving ATC base station 140 and/or other system element of system 100 may command the TDD first radioterminal 130 to use frequencies comprising a separation that is at least X kHz from the frequencies $f_D'$ used by the sensitive second satellite terminal receiver 230. Maintaining the at least X kHz of frequency separation between the frequencies used by the TDD first radioterminal 130 and the frequencies used by the sensitive second satellite terminal receiver 230 can reduce a level of OOCE produced by the TDD first radioterminal 130 within a band of frequencies that is used (or may be used) by the sensitive second satellite terminal receiver 230, thus reducing or eliminating interference at the sensitive second satellite terminal receiver 230. In some embodiments, the band of frequencies that is used by the sensitive second satellite terminal receiver 230 may be predetermined and/or a priori known. In some embodiments, the frequencies used by radioterminal(s) 230 and/or 130 may be frequencies of a satellite L-band, S-band, big/little LEO/MEO-band and/or any other band used to provide space-based communications. In other embodiments, the frequencies used by radioterminal(s) 230 and/or 130 may be frequencies of one or more cellular/PCS bands and/or frequencies of one or more unlicensed bands.

Figure 4:
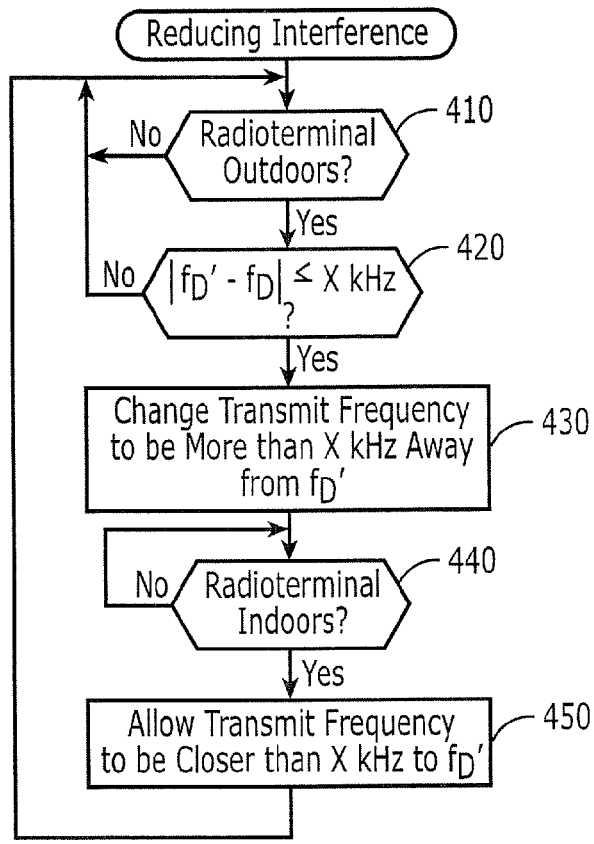
FIGS. 4 and 5 are flowcharts of operations that may be performed to reduce interference and to change transmit frequency, respectively, according to some embodiments of the present invention.

FIG. 4 is a flowchart of operations that may be performed to reduce or eliminate potential interference according to some embodiments of the present invention. Referring now to FIG. 4, at Block 410, a determination is made as to whether a first radioterminal, such as a first radioterminal 130 of FIG. 1, is outdoors, as was illustrated in FIG. 1. As was described above, this determination may be made by and/or be responsive to a measure of power associated with the first radioterminal 130 that may be provided by a closed-loop power control and/or other function of an ancillary terrestrial component 140 (or other infrastructure), a satellite 110 and/or other system element of system 100 operatively serving the first radioterminal 130.

Continuing with the description of FIG. 4, if the first radioterminal 130 is outdoors (Block 410), a determination is made at Block 420 as to whether a frequency separation between a transmit frequency $f_D$ of the first radioterminal 130 and a downlink frequency $f_D'$ that is being received (or may be received) by the second radioterminal 230 is less than or equal to a predetermined separation, such as X kHz, which can create a potential interference path 160. If so, then at Block 430, the transmit frequency $f_D$ of the first radioterminal 130 is changed, such that the changed transmit frequency is more than X kHz away from $f_D'$. As was described above and will be described in more detail below, the first radioterminal 130 may continue to operate in TDD mode at a different satellite downlink frequency (FIG. 2), or the first radioterminal 130 may continue to operate in TDD mode at a satellite uplink frequency (FIG. 3).

Still referring to FIG. 4, when it is determined that the radioterminal 130 is indoors, at Block 440 (as may be determined using closed-loop power control and/or other conventional techniques), at least some transmit frequencies of the first radioterminal 130 can be allowed to be closer than X kHz to at least some of the downlink frequencies of the second radioterminal 230 (at Block 450). The transmit frequencies can be allowed to be closer by shifting to closer TDD frequencies and/or by allowing a fuller TDD carrier occupancy by the TDD terminal 130. Alternatively, depending upon the frequency utilization of the system, a radioterminal 130 that moves indoors 170 may be allowed to continue to operate as it was operating outdoors, without a change in its transmit frequencies.

Figure 5:
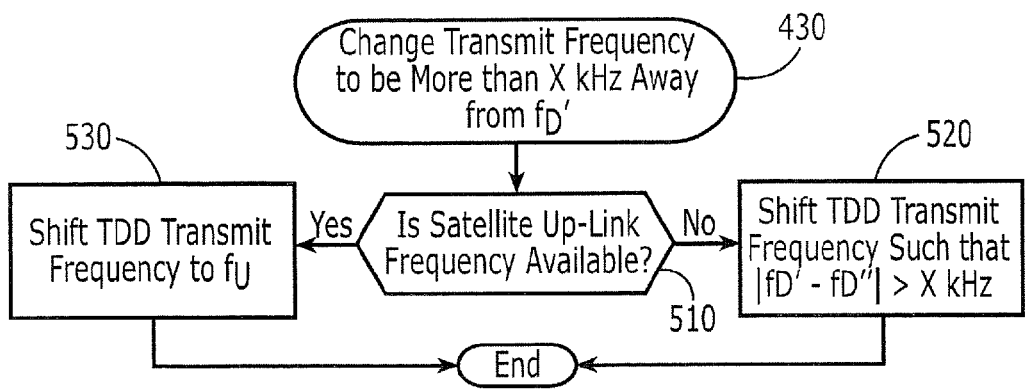

FIG. 5 is a flowchart of operations that may be performed to change the transmit frequencies of radioterminal 130 to be more than X kHz away from $f_D'$, which may correspond to Block 430 of FIG. 4. Referring now to FIG. 5, a determination may be made at Block 510 as to whether satellite uplink frequencies $f_U$ are available. (It will be understood that the term "satellite uplink frequencies" as used herein refers to TDD frequencies belonging to a satellite uplink band). At Block 510, if satellite uplink frequencies are available, according to some embodiments, the satellite uplink frequencies may be preferred relative to at least some satellite downlink frequencies, owing to a greater distance from $f_D'$. Otherwise, the TDD frequencies $f_D$ are changed at Block 520, to $f_D''$, such that a separation between $f_D'$ and $f_D''$ is greater than X kHz, as was illustrated in FIG. 2. Thus, the first radioterminal 130 continues to operate in TDD mode using downlink satellite frequencies $f_D''$ or uplink satellite frequencies $f_U$ that comprise a separation from the downlink frequencies $f_D'$ of the second radioterminal 230 of at least X kHz, as was illustrated in FIG. 2 and/or FIG. 3.

Figure 8:
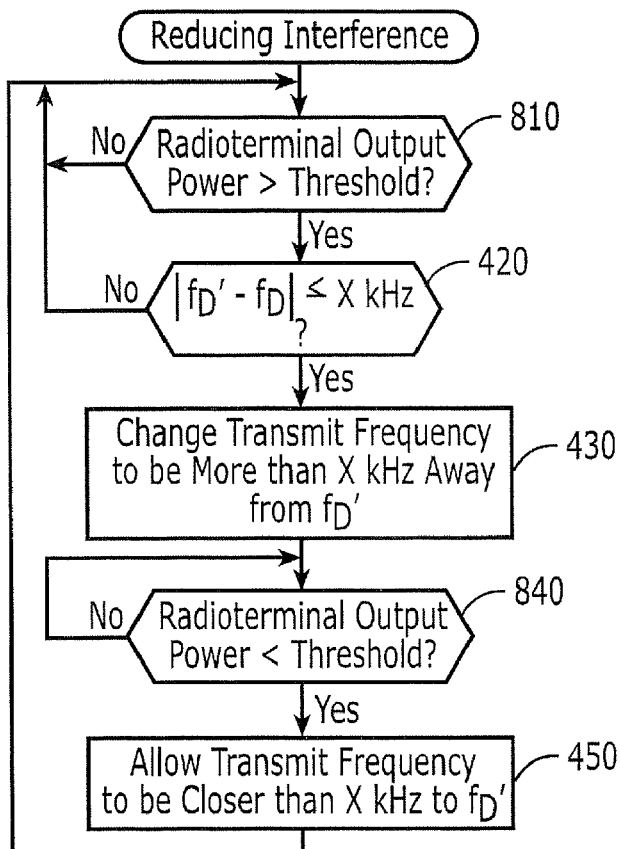
FIGS. 8 and 9 are flowcharts of operations that may be performed to reduce interference, according to other embodiments of the present invention.

FIG. 8 is a flowchart of operations that may be performed to reduce or eliminate interference according to other embodiments of the present invention. These embodiments may arise from recognition that detection regarding a location of the first radioterminal 130 as being, for example, outdoors or indoors, may not need to be performed. Rather, the separation of at least X kHz may be maintained responsive to an output power of the first radioterminal 130, regardless of its location (e.g., outdoors or indoors). Thus, a guardband between frequencies being used by the first radioterminal 130 and the frequencies that are used (or may be used) by the second radioterminal 230 may be imposed on the first radioterminal 130 by a base station 140 serving the first radioterminal 130 and/or other system component of system 100, responsive to an output power of the first radioterminal 130.

More specifically, referring to FIG. 8, a measure of the output power of the first radioterminal is compared to a threshold at Block 810. The threshold may be fixed and/or variable. If the output power is greater than the threshold at Block 810, then operations of Block 420 and 430 are performed as was described above. In some embodiments, when the output power becomes less than a fixed and/or variable threshold at Block 840, the operations of Block 450 are performed. It will be understood that the threshold of Block 840 need not be the same as the threshold of Block 810. Accordingly, the guardband may be imposed responsive to a measure of an output power of the first radioterminal 130, without the need to determine the location of the first radioterminal 130.

Moreover, according to other embodiments of the present invention, a frequency separation (i.e., guardband) that is maintained between frequencies used by the first radioterminal 130 and frequencies used by the second radioterminal 230 need not be fixed, but, rather, may change as a function of increasing/decreasing output power of the first radioterminal 130 and/or as a function of increasing/decreasing activity factor of the first radioterminal 130. In some embodiments, the frequency separation or guardband can monotonically increase as a function of increasing output power and/or increasing activity factor of the first radioterminal 130 and may monotonically decrease as a function of decreasing output power and/or decreasing activity factor of the first radioterminal 130. It will be understood that the term "activity factor" as used herein relates to a bandwidth of a carrier (i.e., a bandwidth of electromagnetic energy) being radiated by radioterminal 130 and/or an interval/percentage of time (typically called a duty factor) over which the radioterminal 130 radiates a carrier (i.e. radiates electromagnetic energy).

Figure 9:
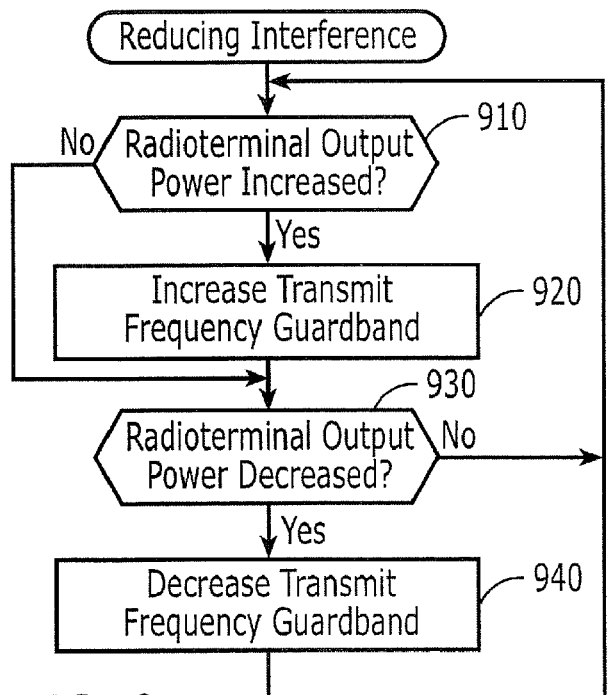

FIG. 9 is a flowchart of operations that may be performed using a variable guardband or frequency separation, according to some embodiments of the present invention. In particular, as shown at Block 910, if the output power and/or activity factor of the first radioterminal 130 increases, or increases by a predetermined amount, then at Block 920, a transmit frequency guardband is increased. In some embodiments, at Block 930, if the radioterminal output power and/or activity factor decreases, or decreases by a predetermined amount, then at Block 940, the transmit frequency guardband also may be decreased. It will be understood that the amounts of increase and decrease need not be symmetrical/identical therebetween and the amount of increase/decrease need not be a linear function of power and/or activity factor. However, in some embodiments, the guardband may monotonically increase and monotonically decrease as a function of increase and decrease of output power and/or activity factor, respectively, of the first radioterminal 130.

Additional discussion of various embodiments of the present invention will now be provided. In particular, according to some embodiments of the present invention, MSV's radioterminals 130 operating in the United States in TDD mode while using satellite downlink frequencies in the 1525-1559 MHz band (or any other satellite downlink band) can restrict unwanted emissions to −70 dBW/MHz EIRP (−94 dBW/4 kHz EIRP), or less, into bands used by Global Maritime Distress and Safety System (GMDSS) receivers, aeronautical (e.g., helicopter) receivers and/or any other satellite Mobile Earth Terminal (MET) receivers 230 that may be operated by Inmarsat and/or any other operator. The specified level of protection can be provided operationally by configuring all (US-wide), nearly all or at least some ATC base stations 140 to restrict the frequencies of operation of terminals 130 that are detected to be operating outdoors by a minimum guardband distance from the bands used by GMDSS, aeronautical and/or any other satellite MET receivers 230, as further described below. It will be understood that the level of −70 dBW/MHz EIRP (−94 dBW/4 kHz EIRP) of unwanted emissions (e.g., Out-of-Channel Emissions (OOCE)), is used for purposes of illustration and that any level of OOCE may be used in accordance with embodiments of the present invention.

In some embodiments, as was illustrated in FIG. 3 and Block 530 of FIG. 5, frequencies are assigned in a satellite uplink band (1626.5-1660.5 MHz) to first radioterminals 130 that are operating outdoors. For example, when a first radioterminal 130 is operating using frequencies of a satellite downlink band $f_D$ and the output power of the first radioterminal drops to (or below) $P_{MAX}$−SAM (SAM≡Structural Attenuation Margin provided on a return link by the ATC base station 140 serving the radioterminal 130) the first radioterminal 130 can be switched to frequencies in the satellite uplink band $f_U$, i.e., continue to operate in TDD mode but using frequencies of the satellite uplink band. A measure of an output power of the first radioterminal 130 being at (or below) $P_{MAX}$−SAM can be used to detect (by the base station 140 and/or any other system element of system 100 serving the first radioterminal 130) that the first radioterminal 130 is operating outdoors.

In other embodiments, as was illustrated in FIG. 2 and Block 520 of FIG. 5, TDD mode may be maintained using satellite downlink frequencies, and a sufficient guardband may be maintained between frequencies $f_D''$ used by first radioterminals 130 operating outdoors and frequencies $f_D'$ used by GMDSS, aeronautical (e.g., helicopter) and/or other satellite MET receivers 230 (e.g., sensitive satellite terminal receivers). For example, when a first radioterminal 130 is operating using frequencies of the satellite downlink band $f_D$ and the output power of the first radioterminal 130 drops to (or below) $P_{MAX}$–SAM, the ATC base station 140 and/or other system element of system 100 serving the first radioterminal 130 may restrict the first radioterminal 130 to operate using frequencies that are at least at a minimum guardband distance away from bands used (or may be used) by sensitive satellite terminal receiver(s) 230. This can provide –70 dBW/MHz EIRP (–94 dBW/4 kHz EIRP), or less, of emissions into the bands used by the sensitive satellite terminal receiver(s), as specified further below.

MSV's ATC network can include a minimum of, for example, 20 dB of closed-loop power control dynamic range. Closed-loop power control enables an ATC base station 140 and/or other system element of system 100 serving a first radioterminal 130 to control the first radioterminal 130 to radiate minimum but sufficient power to maintain acceptable link performance. As such, the output power level of any first radioterminal 130 can be known by the ATC base station 140 and/or other system element serving the first radioterminal 130. The ATC base station 140 and/or other system element can also maintain control over the frequencies and/or activity factor used by the first radioterminal 130. As such, when a first radioterminal 130 is operating at a power level that is at least SAM dB less than maximum (indicating that the first radioterminal 130 is operating outdoors) that first radioterminal 130 may be served by frequencies that are sufficiently removed from frequencies used by GMDSS, aeronautical and/or any other satellite MET receivers 230. That is, the first radioterminal 130 may be served via satellite uplink frequencies (FIG. 3) or via satellite downlink frequencies that are sufficiently removed from the bands used by GMDSS, aeronautical and/or any other satellite MET receivers (FIG. 2).

Accordingly, some embodiments of the invention can operationally provide an enforceable technical specification that unwanted emissions of first radioterminals 130 into bands used by receivers 230 will be –70 dBW/MHz EIRP (–94 dBW/4 kHz) EIRP, or less. Each ATC base station 140, or at least some ATC base stations 140, can be deployed to function in accordance with embodiments of FIG. 2 and/or FIG. 3 (as also illustrated in FIGS. 4 and 5) to operationally assure that first radioterminals 130 operating outdoors generate no more than a specified level of unwanted emissions into bands used by radioterminal receivers 230.

Accordingly, some embodiments of the invention can allow the operator of the first satellite radioterminal communications system 100 (such as MSV) to certify and/or demonstrate, as appropriate, that:

(1) An ATC base station 140 that provides a structural attenuation margin of SAM dB for first radioterminals 130 shall restrict the frequencies of first radioterminals 130 operating outdoors in accordance with an applicable guardband, for example as specified in Tables 1 and 2 below; and (2) A first radioterminal 130 that is operating at an output power level that is at (or below) $P_{MAX}$–SAM, shall have its operating frequencies restricted in accordance with a minimum guardband, for example, as specified in Tables 1 and 2 below, and the first radioterminal 130 shall provide –70 dBW/MHz EIRP (–94 dBW/4 kHz EIRP), or less, of unwanted emissions into bands used by receivers 230.

TABLE 1

Illustrative Guardbands for a 5 MHz TDD Carrier

| Structural Attenuation Margin (SAM) Provided by ATC Base Station (dB) | Output Power Level of MSV Radioterminal ($P_O$) | Minimum Guardband Distance from Frequencies used by Sensitive Satellite Terminal Receivers (kHz) |
|---|---|---|
| 18 | $P_O \leq P_{MAX} - 18$ | 400 |
| 12 | $P_O \leq P_{MAX} - 12$ | 500 |
| 8 | $P_O \leq P_{MAX} - 8$ | 700 |
| 4 | $P_O \leq P_{MAX} - 4$ | 900 |

TABLE 2

Illustrative Guardbands for a 10 MHz TDD Carrier

| Structural Attenuation Margin (SAM) Provided by ATC Base Station (dB) | Output Power Level of MSV Radioterminal ($P_O$) | Minimum Guardband Distance from Frequencies used by Sensitive Satellite Terminal Receivers (kHz) |
|---|---|---|
| 18 | $P_O \leq P_{MAX} - 18$ | 800 |
| 12 | $P_O \leq P_{MAX} - 12$ | 900 |
| 8 | $P_O \leq P_{MAX} - 8$ | 1000 |
| 4 | $P_O \leq P_{MAX} - 4$ | 1500 |

Figure 6:
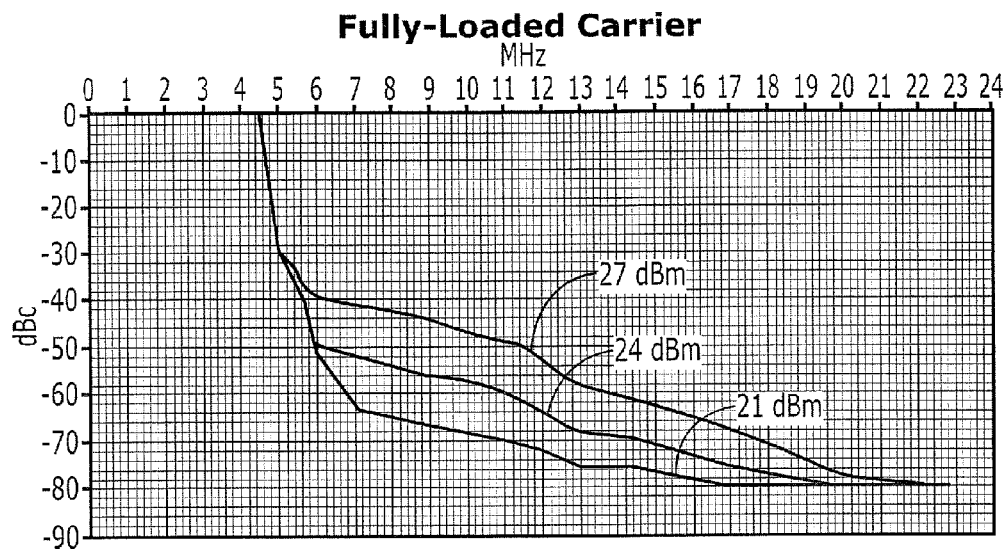
FIG. 6 graphically illustrates simulated out-of-channel emissions (OOCE) levels of a fully loaded Time Division Duplex (TDD) WiMAX carrier.
Figure 7:
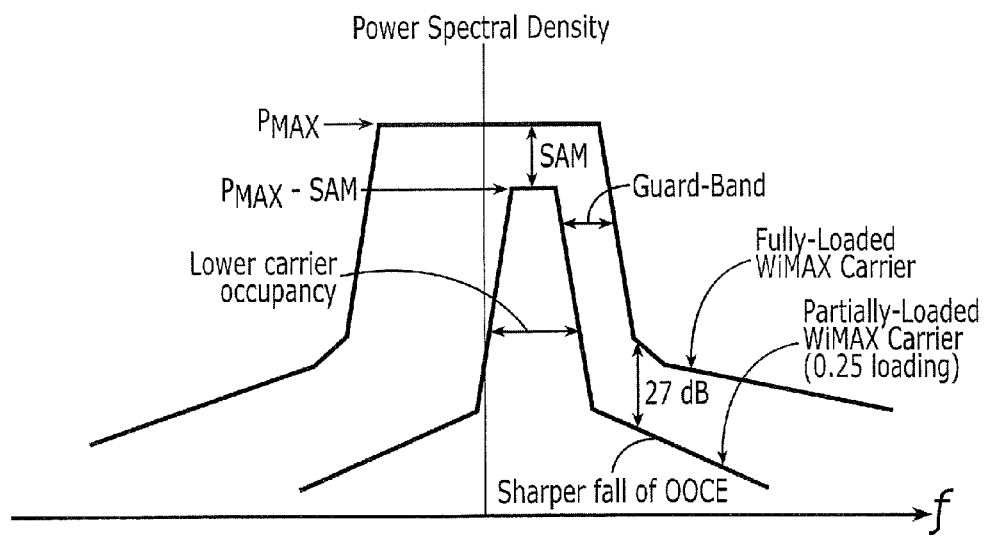
FIG. 7 graphically illustrates establishment of a guardband to reduce OOCE, according to some embodiments of the present invention.

FIG. 6 illustrates simulated Out-of-Channel Emissions (OOCE) levels of a TDD carrier (WiMAX carrier) for a Power Amplifier (PA) output power level of 27 dBm, 24 dBm and 21 dBm. As is evident from FIG. 6, as the PA output power level decreases, the OOCE at the PA output decreases (i.e., a spectral re-growth level due to a non-linear characteristic of the PA decreases). According to embodiments of the invention, when a first radioterminal 130 is operating outdoors, requiring a lesser EIRP to communicate with base station 140 (since the first radioterminal 130 is not subject to, or is minimally subject to, structural attenuation when operating outdoors), the PA output power level of the first radioterminal 130 may be reduced by approximately SAM dB, a carrier occupancy (activity factor) of the first radioterminal 130 may be restricted to, for example, ¼, ⅛, 1/16, etc. of a carrier occupancy of a fully-loaded carrier (e.g., 2.5 MHz, 1.25 MHz, 625 kHz, etc., respectively, for a 10 MHz WiMAX carrier) and the SAM-dependent guardband may be imposed on the frequencies of operation of the first radioterminal 130 (i.e., a set of frequencies allocated to the first radioterminal 130 by base station 140 may be restricted to be at a distance relative to frequencies that are used, or may be used, by satellite terminal(s) 230. FIG. 7 further illustrates these operations.

Additional discussion of the embodiments of the invention according to FIG. 8 and FIG. 9 now will be provided. In particular, first radioterminals 130 operating in the United States in TDD mode while using frequencies of a satellite downlink band 1525-1559 MHz, or any other satellite downlink band, may restrict unwanted emissions into bands used by sensitive satellite terminal receivers 230 to –94 dBW/4 kHz EIRP or less, in some of these embodiments. The specified level of protection may be provided operationally by configuring ATC base stations 140, US-wide (or at least some ATC base stations 140) to control frequencies used by first radioterminals 130, such that a minimum guardband is maintained relative to the frequencies used by the sensitive satellite terminal receivers 230. The minimum guardband may depend on the output power level and/or activity factor of the first radioterminal 130, increasing as the output power and/or activity factor of the first radioterminal 130 increases. Thus, in order to potentially provide fail-safe protection, these embodiments may assume that all first radioterminals 130 are operating outdoors, so that a determination of location of the first radioterminals 130 need not be performed.

In some embodiments of FIGS. 8 and 9, at least some base stations 140 may be configured to restrict the frequencies used by first radioterminals 130, so as to maintain a minimum guardband relative to frequencies used by sensitive satellite terminal receivers 230. The minimum guardband may depend on an output power level and/or activity factor of the first radioterminal 130 and may be determined dynamically by the base station 140 and/or other system element serving the first radioterminal 130 responsive to the output power level and/or activity factor of the first radioterminal 130. In some embodiments, the determination may be made by a system element other than base station 140 and/or by a system element that is connected to the base station 140. The minimum guardband may be chosen so as to limit unwanted emissions of the first radioterminal 130 into bands used by the satellite terminal receivers 230 to an EIRP of −94 dBW/4 kHz, or less. Tables 3 and 4 illustrate the minimum guardband as a function of the first radioterminal 130 output power level according to some embodiments of the invention. The values are based on simulations of a Power Amplifier (PA) being developed for MSV's radioterminals. As prototype PAs become available, measurements may be conducted to further verify and/or adjust the values presented below.

TABLE 3

Illustrative Guardbands for a 5 MHz TDD (WiMAX) Carrier

| Output Power of MSV Radioterminal ($P_{MAX}$ = 24 dBm) | Minimum Guardband (kHz) |
|---|---|
| $P_O = P_{MAX} - 24$ | 300 |
| $P_O = P_{MAX} - 18$ | 400 |
| $P_O = P_{MAX} - 12$ | 500 |
| $P_O = P_{MAX} - 8$ | 700 |
| $P_O = P_{MAX} - 4$ | 900 |
| $P_O = P_{MAX}$ | 3300 |

TABLE 4

Illustrative Guardbands for a 10 MHz TDD (WiMAX) Carrier

| Output Power of MSV Radioterminal ($P_{MAX}$ = 24 dBm) | Minimum Guardband (kHz) |
|---|---|
| $P_O = P_{MAX} - 24$ | 500 |
| $P_O = P_{MAX} - 18$ | 800 |
| $P_O = P_{MAX} - 12$ | 900 |
| $P_O = P_{MAX} - 8$ | 1000 |
| $P_O = P_{MAX} - 4$ | 1500 |
| $P_O = P_{MAX}$ | 5600 |

In other embodiments, MSV's terminals 130 operating in the United States in TDD mode while using frequencies of a satellite downlink band, such as, 1525-1559 MHz, or any other band (satellite and/or terrestrial), may limit OOCE into bands used by sensitive (satellite terminal) receivers 230 to −107 dBW/4 kHz EIRP. The specified level of protection may be provided operationally by configuring all, or at least some ATC base stations 140 to constrain the frequencies and/or activity factor of MSV's terminals.

In accordance with some embodiments, at least some ATC base stations may be configured to restrict the frequencies and/or activity factor used by TDD-mode terminals 130. Accordingly, a TDD-mode terminal 130 may maintain a minimum guardband between frequencies used by the terminal 130 and frequencies used (or may be used) by sensitive satellite terminal receivers 230 and the terminal 130 may not be allowed to exceed a predetermined activity factor which may, according some embodiments, be guardband dependent. The guardband and limit on activity factor imposed on a terminal 130 may be imposed dynamically by a base station and/or other system element that is serving/controlling and/or is operatively connected to the terminal 130 responsive to an output power level of the terminal 130 in order to provide the OOCE limit of −107 dBW/4 kHz or any other desired OOCE limit.

In some embodiments according to the present invention, a channel bandwidth allocated to a terminal 130 may be dynamically assigned to the terminal 130 by a base station and/or other system element serving/controlling the terminal 130 responsive to a service request made by the terminal 130 and an output power requirement of the terminal 130 (as determined by the base station and/or the other system element via, for example, closed-loop power control). For example, if the terminal 130 requests to establish a voice session, the terminal 130 may be assigned a relatively narrow-band channel commensurate with voice requirements. If the terminal 130 requests a data session, a bandwidth of a channel assigned to the terminal 130 may depend on a size of a data file to be transmitted by the terminal 130, an available bandwidth at the time the request is made and a number of other terminals 130 competing for service. In addition to the above, in order to operationally satisfy an OOCE limit requirement, the bandwidth, duty factor and/or placement of the channel allocated to the terminal 130 may be further modified and/or selected responsive to an output power level of the terminal 130.

In further embodiments, in order to operationally satisfy an OOCE limit, a bandwidth, duty factor and/or placement of a channel allocated to a terminal 130 may be selected and/or adjusted responsive to a state associated with a detection of a signal at a base station. The bandwidth, duty factor and/or placement of a channel allocated to the terminal 130 may also be selected responsive to an output power level of the terminal 130. It will be understood that the term "placement of a channel" as used herein refers to a set of frequencies associated with the channel and/or a distance between the set of frequencies associated with the channel and a set of frequencies that are used, or may be used, by a sensitive satellite terminal receiver 230.

In some embodiments, a detection of a signal at a base station comprises detecting at a base station 140 a signal that is being transmitted by a satellite terminal 230. The base station 140 may be configured to receive and process bands of frequencies that are used by satellite terminals 230 to transmit information to the space-based component 210 and/or any other system element of system 200. In some embodiments, the detection of a signal at a base station may be based upon a time-domain and/or frequency-domain processing of a received signal. The time-domain and/or frequency-domain processing of the received signal may, in accordance with some embodiments of the invention, comprise one or more Analog-to-Digital (A/D) conversions, filtering operations, amplification operations and/or Fourier transformations, not necessarily in the order stated. In some embodiments of the present invention, the one or more Fourier transformations may comprise a Fast Fourier Transformation (FFT) and/or a Discrete Fourier Transformation (DFT).

Accordingly, in some embodiments of the invention, responsive to the detection of a signal at a base station 140 and responsive to an output power level of the terminal 130, a bandwidth, duty factor and/or placement of a channel allocated to the terminal 130 by the base station 140 and/or other system element is/are selected/modified to satisfy a OOCE limit. The OOCE limit may be a predetermined OOCE limit. Absent a detection of a signal at base station 140, there may not be any OOCE-related constraint(s) that may be imposed on the bandwidth, duty factor and/or placement of a channel allocated to the terminal 130.

Thus, in embodiments of the present invention, responsive to the detection of a signal at a base station 140, the bandwidth of a channel allocated to a terminal 130 may be selected, modified and/or adjusted responsive to an output power level of the terminal 130. In some embodiments, as the output power level of the terminal 130 increases the bandwidth of a channel allocated to the terminal 130 decreases. In further embodiments, responsive to a detection of a signal at a base station 140, the duty factor allocated to the terminal 130 may also be adjusted responsive to an output power level of the terminal 130 (e.g., as the output power level of the terminal 130 increases the duty factor allocated to the terminal 130 decreases). In still further embodiments, responsive to a detection of a signal at a base station 140, the placement of a channel allocated to the terminal 130 may also be adjusted such that, as an output power level of the terminal 130 increases a distance between a set of frequencies associated with the channel that is allocated to the terminal 130 and a set of frequencies that is used, or may be used, by a sensitive satellite terminal receiver 230 increases. In accordance with embodiments of the present invention, an OOCE requirement/limit may be in the range between $-110$ dBW/4 kHz and $-100$ dBW/4 kHz. In accordance with further embodiments of the present invention, an OOCE limit may be greater than $-100$ dBW/4 kHz. A forward link control channel that may be transmitted by the space-based component 210 to provide control information to terminal(s) 230 may be transmitted by the space-based component 210 using frequencies that are sufficiently distant from frequencies that may be used by terminal(s) 130 and/or ATCs 140 to thereby reduce, or prevent interference relating to the reception of the control channel by terminal(s) 230.

In further embodiments, a satellite terminal 230 may be configured to receive and process GPS signals to derive a measure of location of the satellite terminal 230. The measure of location associated with the satellite terminal 230 may be relayed by the satellite terminal 230 to an element of system 200, such as, for example, to a gateway 220 and the measure of location of satellite terminal 230 may be relayed by system 200 to system 100. Accordingly, a base station 140 and/or other system element of system 100 may determine that a satellite terminal 230 is within a service area associated with a base station 140. In accordance with some embodiments of the invention, responsive to a determination by a base station 140 and/or other system element of system 100 that a satellite terminal 230 is within a service area associated with a base station 140 and responsive to an output power level of the terminal 130, a bandwidth, duty factor and/or placement of a channel allocated to the terminal 130 by the base station 140 and/or other system element is/are selected/modified to satisfy an OOCE limit. Absent a determination by base station 140 that a satellite terminal 230 is within a service area associated with the base station 140 there may not be any OOCE-related constraint(s) that may be imposed on the bandwidth, duty factor and/or placement of a channel allocated to the terminal 130.

In some embodiments, a selection, modification and/or adjustment of a bandwidth of a channel that is allocated (or is to be allocated) to a terminal 130, a duty factor that is allocated (or is to be allocated) to the terminal 130 and/or a placement of the channel that is allocated (or is to be allocated) to the terminal 130 may be performed recursively by a base station 140 and/or other system element of system 100 and/or may comprise a plurality of steps. At a completion of each recursion/step a decision may be made regarding whether a current selection of the bandwidth of the channel, the duty factor and the placement of the channel satisfy a desired level of OOCE. If the decision is that the current selection of the bandwidth of the channel, the duty factor and the placement of the channel will enable the terminal 130 to satisfy the desired level of OOCE, the current selection of the bandwidth of the channel, the duty factor and the placement of the channel are allocated to the terminal 130 by the base station 140. If the decision is that the current selection of the bandwidth of the channel, the duty factor and the placement of the channel will not, or may not, enable the terminal 130 to satisfy the desired level of OOCE, a further adjustment/modification of the bandwidth of the channel, the duty factor and the placement of the channel may be made.

In further embodiments of the invention, detecting at a base station 140 a signal that is being transmitted by a satellite terminal 230 may not be performed. Instead, based on a priori knowledge of a region that may include one or more satellite terminals 230, a measure of location associated with a terminal 130 may be used to determine a distance between the terminal 130 and a perimeter associated with the region that may include one or more satellite terminals 230. The measure of location may be based upon processing of GPS signals by the terminal 130, base station 140 and/or other system element of system 100. In accordance with some embodiments of the invention, in order to operationally satisfy an OOCE limit, a bandwidth, duty factor and/or placement of a channel that is allocated (or is to be allocated) to a terminal 130 may be selected, adjusted and/or constrained responsive to a determination that the distance between the terminal 130 and the perimeter associated with the region that may include one or more satellite terminals 230 is less than (or may be less than) a predetermined threshold. Absent a determination that the distance between the terminal 130 and the perimeter associated with the region that may include one or more satellite terminals 230 is less than (or may be less than) the predetermined threshold (which, in some embodiments may be 50 meters), there may not be any OOCE-related constraint(s) that may be imposed on the bandwidth, duty factor and/or placement of a channel that is allocated (or is to be allocated) to the terminal 130 or there may be less stringent OOCE-related constraint(s) that may be imposed on the bandwidth, duty factor and/or placement of a channel that is allocated (or is to be allocated) to the terminal 130.

In further embodiments of the invention, a communications link 134 between a base station 140 and a terminal 130 is a Time Division Duplex (TDD) communications link (as illustrated in FIG. 1) wherein a channel that is providing information from the base station 140 to the terminal 130 is non-contiguously distributed over a first frequency range that is associated with an aggregate frequency range of the communications link 134 and wherein a channel that is providing information from the terminal 130 to the base station 140 is substantially contiguously distributed over a second frequency range associated with the aggregate frequency range of the communications link 134. In some embodiments of the present invention, the second frequency range is smaller than the first frequency range. The first frequency range may be approximately (or substantially) equal to the aggregate frequency range associated with a communications link, such as communications link 134, wherein the aggregate frequency range may be an aggregate bandwidth allocated to a TDD carrier (e.g., 5 MHz, 10 MHz). Accordingly, in some embodiments of the present invention, the first frequency range may be approximately 5 MHz or approximately 10 MHz and the second frequency range may be 2.5 MHz, 1.25 MHz, 625 kHz or less. It will be understood that the term "non-contiguously distributed" as used herein to describe a channel, means that the channel comprises adjacent frequency-domain elements (sub-carriers) that are separated therebetween by a frequency distance and that the frequency distance comprises and/or can accommodate at least one frequency-domain element (sub-carrier) associated with another channel.

In still further embodiments of the present invention, at least some, and in some embodiments all, terminals 130 are equipped with GPS signal processing capability and are thus cognizant of their location, at least approximately. Accordingly, at least some terminals 130 that are being served by an ATC base station 140 may be configured to relay a measure of their location to the ATC base station 140. An ATC base station 140 that is serving a region associated with a harbor, navigable waterway and/or other sensitive area may be configured with knowledge of the coordinates relating to, for example, an edge/perimeter of the harbor, navigable waterway and/or other sensitive area. Accordingly, the ATC base station 140 may be able to estimate a minimum distance between a terminal 130 and the edge/perimeter of the harbor, navigable waterway and/or other sensitive area and, by assuming free-space propagation, or any other propagation model, may be able to calculate/estimate a propagation loss between the terminal 130 and the edge/perimeter (or other location) of the harbor, navigable waterway and/or other sensitive area. In some embodiments, the ATC base station 140 is configured to calculate/estimate a propagation loss between the terminal 130 and a location that is at a distance (e.g., 50 meters) from the edge of the harbor, navigable waterway and/or other sensitive area. Based on the calculation and/or estimation by the ATC base station 140, an allowed OOCE of the terminal 130 may be evaluated and the frequencies, activity factor and/or placement of a channel of the terminal 130 may be constrained, as necessary, by the ATC base station 140, responsive to the calculation and/or estimation to assure that at the distance (e.g., 50 meters) from the edge of the harbor, navigable waterway and/or other sensitive area the OOCE does not exceed a desired threshold (limit) such as, for example, −107 dBW/4 kHz. Any terminal 130 that is determined by an ATC base station 140 to be closer than the distance (e.g., 50 meters) from the edge of the harbor, navigable waterway and/or other sensitive area, or to be within the harbor, navigable waterway and/or other sensitive area (e.g., on a boat), may be denied service by the ATC base station 140. In further embodiments of the present invention, service may be denied only if the ATC base station 140 has detected an emission by a satellite terminal 230. In still further embodiments, based on the calculation and/or estimation by the ATC base station 140, an allowed OOCE of the terminal 130 may be evaluated and the frequencies, activity factor and/or placement of a channel of the terminal 130 may be constrained, as necessary, by the ATC base station 140, responsive to the calculation and/or estimation in order to assure that at a distance from the edge of the harbor, navigable waterway and/or other sensitive area the OOCE does not exceed a threshold limit, such as, for example, −107 dBW/4 kHz, only if the ATC base station 140 has detected an emission by a satellite terminal 230. Absent detection of the emission by the ATC base station 140, the frequencies, activity factor and/or placement of a channel of the terminal 130 may not be subjected to any OOCE-related constraint.

In further embodiments, in order to operationally satisfy an OOCE limit, a bandwidth, duty factor and/or placement of a channel allocated to a terminal 130 may be selected and/or adjusted responsive to a state associated with a detection of a signal at the terminal 130. The bandwidth, duty factor and/or placement of a channel allocated to the terminal 130 may also be selected responsive to an output power level of the terminal 130. It will be understood that the term "placement of a channel" as used herein refers to a set of frequencies associated with the channel and/or a distance between the set of frequencies associated with the channel and a set of frequencies that are used, or may be used, by a satellite terminal receiver 230.

In some embodiments of the invention, a detection of a signal at a terminal 130 comprises detecting at the terminal 130 a signal that is being transmitted by a satellite terminal 230 and informing a base station 140 serving the terminal 130. The terminal 130 may be configured to receive and process bands of frequencies that are used by satellite terminals 230 to transmit information to the space-based component 210 and/or any other system element of system 200. In accordance with some embodiments of the present invention, the detection of a signal at a terminal 130 may be based upon a time-domain and/or frequency-domain processing of a received signal. The time-domain and/or frequency-domain processing of the received signal may, in accordance with some embodiments of the present invention, comprise one or more Analog-to-Digital (A/D) conversions, filtering operations, amplification operations and/or Fourier transformations, not necessarily in the order stated. In some embodiments of the present invention, the one or more Fourier transformations may comprise a Fast Fourier Transformation (FFT) and/or a Discrete Fourier Transformation (DFT).

Accordingly, in some embodiments of the invention, responsive to the detection of a signal at a terminal 130 and responsive to an output power level of the terminal 130, a bandwidth, duty factor and/or placement of a channel allocated to the terminal 130 by the base station 140 and/or other system element is/are selected/modified to satisfy a OOCE limit. The OOCE limit may be a predetermined OOCE limit. Absent a detection of a signal at terminal 130, there may not be any OOCE-related constraint(s) that may be imposed on the bandwidth, duty factor and/or placement of a channel allocated to the terminal 130.

Thus, in embodiments of the present invention, responsive to the detection of a signal at a terminal 130, the bandwidth of a channel allocated to a terminal 130 may be selected, modified and/or adjusted responsive to an output power level of the terminal 130. In some embodiments, as the output power level of the terminal 130 increases the bandwidth of a channel allocated to the terminal 130 decreases. In further embodiments, responsive to a detection of a signal at a terminal 130, the duty factor allocated to the terminal 130 may also be adjusted responsive to an output power level of the terminal 130 (e.g., as the output power level of the terminal 130 increases the duty factor allocated to the terminal 130 decreases). In still further embodiments, responsive to a detection of a signal at a terminal 130, the placement of a channel allocated to the terminal 130 may also be adjusted such that, as an output power level of the terminal 130 increases a distance between a set of frequencies associated with the channel that is allocated to the terminal 130 and a set of frequencies that is used, or may be used, by a sensitive satellite terminal receiver 230 increases. In accordance with embodiments of the present invention, an OOCE requirement/limit may be in the range between −110 dBW/4 kHz and −100 dBW/4 kHz. In accordance with further embodiments of the present invention, an OOCE limit may be greater than −100 dBW/4 kHz. A forward link control channel that may be transmitted by the space-based component 210 and/or the space-based component 110 to provide control information to terminal(s) 230 and/or to terminal(s) 130 may be transmitted by the space-based component(s) 210/110 using frequencies that are sufficiently distant from frequencies that may be used by terminal(s) 130 and/or ATCs 140 to thereby reduce, or prevent interference relating to the reception of the control channel by terminal(s) 230/130. In further embodiments, the forward link control channel may be transmitted by the space-based component(s) 210/110 at an increased power level and/or EIRP level to thereby reduce, or prevent interference relating to the reception of the control channel by terminal(s) 230/130.

Table 5 and Table 6 illustrate guardband values as a function of output power of terminal 130 for a channel bandwidth of terminal 130 of $1/8^{th}$ of a TDD carrier bandwidth and an activity factor of terminal 130 of $1/12$ (i.e., the terminal 130 transmits during a time interval that is $1/12$ of a TDD frame; the TDD frame is assumed to be 5 ms). The guardband values that are presented in Table 5 and Table 6 are based on simulations and mathematical modeling of a Power Amplifier (PA) currently being developed for MSV's TDD-mode terminals 130. Following the development and further characterization of the PA, the values presented in Table 5 and/or Table 6 may be adjusted, as necessary. Additional Tables may be developed for various other TDD carrier types, channel bandwidths and activity factors of terminal 130. The guardband values presented in Table 5 and Table 6 denote an edge-to-edge distance between the closest band that is used (or may be used) by sensitive satellite terminal receivers 230 and frequencies of a channel that may be allocated to terminal 130. The OOCE limit is −107 dBW/4 kHz. Table 5 and Table 6 respectively relate to 5 MHz and 10 MHz TDD carrier bandwidths (i.e., the aggregate frequency range associated with communications link 134 of FIG. 1). Table 5 and Table 6 illustrate how, for a fixed duty factor of $1/12$, the placement of the channel (i.e., the guardband) may be chosen responsive to the output power level of the terminal 130 in order to satisfy the specified limit of OOCE (−107 dBW/4 kHz). It will be understood that reducing the duty factor to less than $1/12$ may yield reduced guardband values and that increasing the duty factor to more than $1/12$ may yield increased guardband values.

Figure 10:
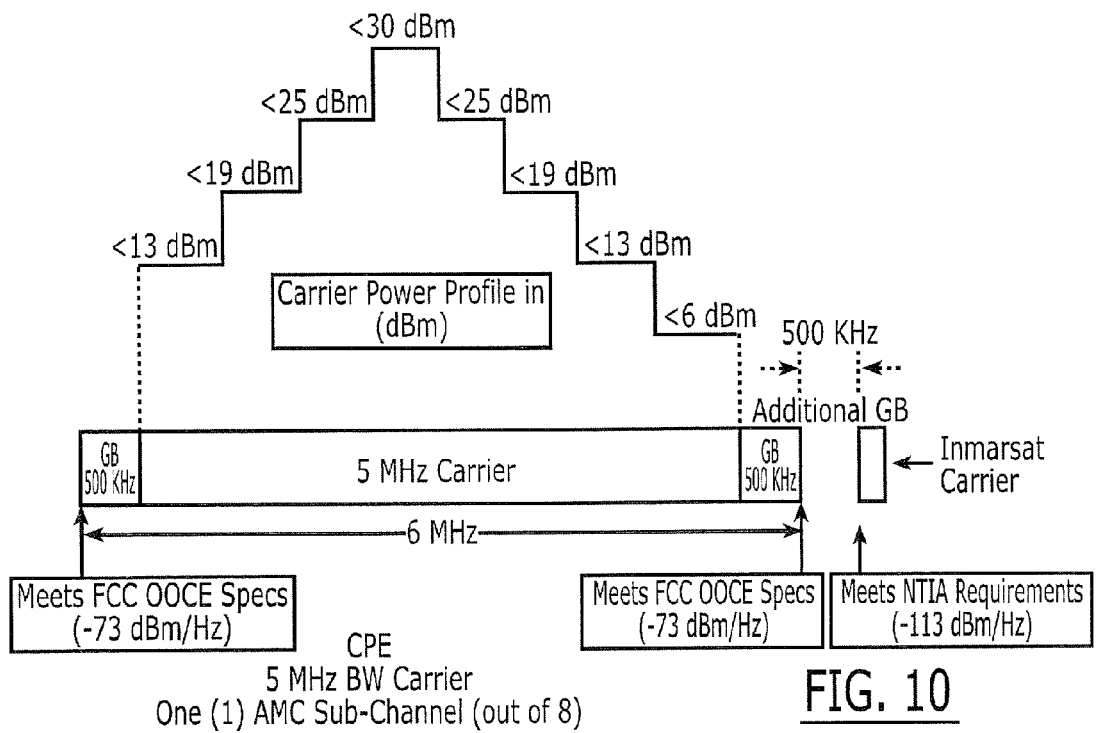
FIGS. 10 and 11 illustrate changing of frequencies and/or channel placement responsive to an output power level of a first radioterminal, according to still other embodiments of the present invention.
Figure 11:
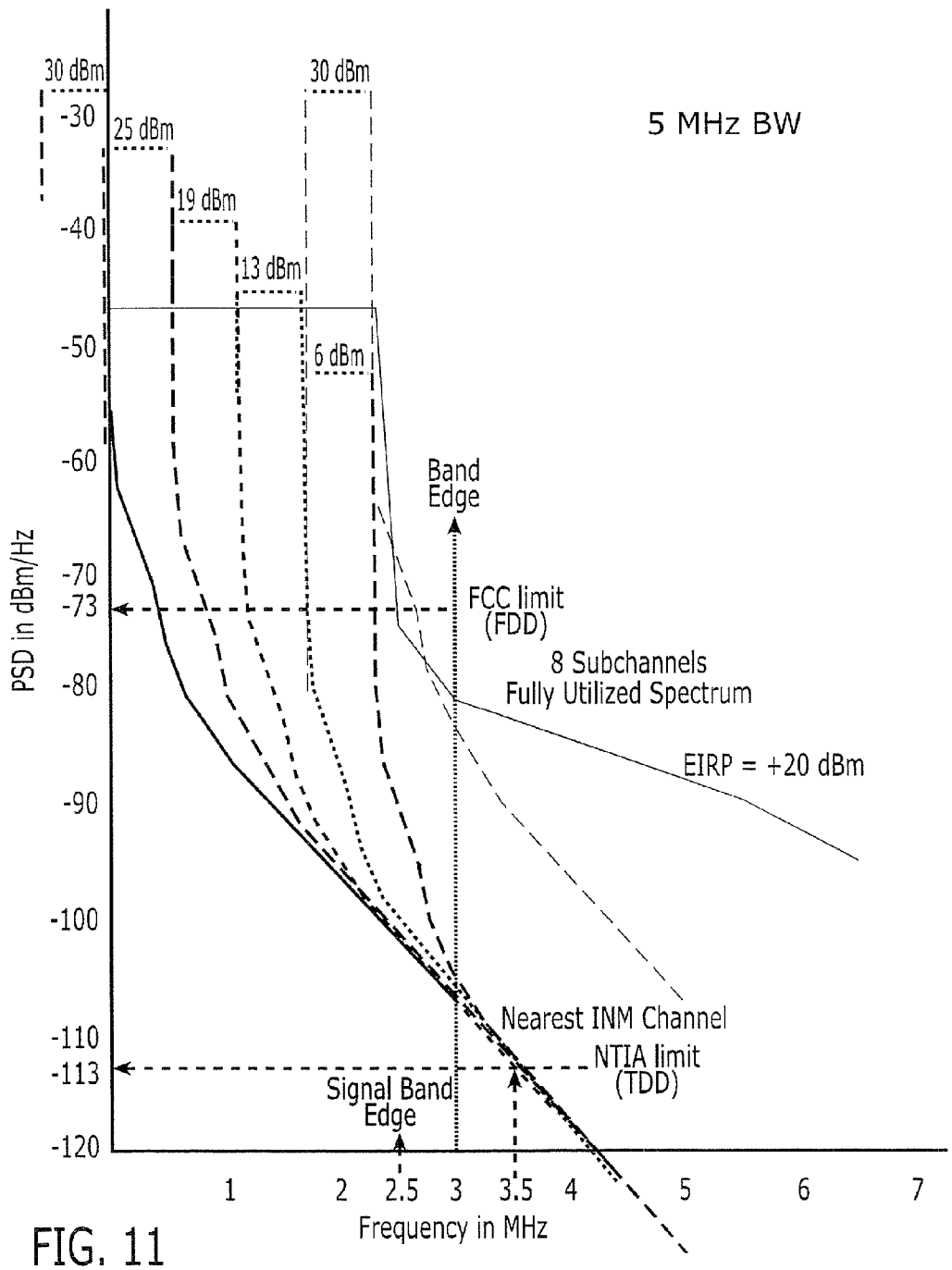

FIG. 10 and FIG. 11 further illustrate allocation of frequencies and/or channel placement relating to a terminal 130 as a function of and/or responsive to an output power level and/or an EIRP level of the terminal 130. Occupancy of a 5 MHz TDD carrier by the terminal 130 is assumed to be $1/8$.

TABLE 5

Illustration of Guardbands for a 5 MHz TDD Carrier
(Channel Bandwidth of Terminal 130 = 625 kHz;
Duty Factor of Terminal 130 = 1/12)

| Output Power of MT ($P_{MAX}$ = 24 dBm) | Guardband (kHz) |
|---|---|
| $P_O = P_{MAX} - 24$ | 300 |
| $P_O = P_{MAX} - 18$ | 400 |
| $P_O = P_{MAX} - 12$ | 500 |
| $P_O = P_{MAX} - 8$ | 700 |
| $P_O = P_{MAX} - 4$ | 900 |
| $P_O = P_{MAX}$ | 3300 |

TABLE 6

Illustration of Guardbands for a 10 MHz TDD Carrier
(Channel Bandwidth of Terminal 130 = 1.25 MHz;
Duty Factor of Terminal 130 = 1/12)

| Output Power of MT ($P_{MAX}$ = 24 dBm) | Guardband (kHz) |
|---|---|
| $P_O = P_{MAX} - 24$ | 500 |
| $P_O = P_{MAX} - 18$ | 800 |
| $P_O = P_{MAX} - 12$ | 900 |
| $P_O = P_{MAX} - 8$ | 1000 |
| $P_O = P_{MAX} - 4$ | 1500 |
| $P_O = P_{MAX}$ | 5600 |

In the specification and Figures, there have been disclosed embodiments of the invention and, although specific terms are employed, they are used in a generic and descriptive sense only and not for purposes of limitation. While the present invention has been described in detail by way of illustration and example of preferred embodiments, numerous modifications, substitutions and/or alterations are possible without departing from the scope of the invention as described herein. Numerous combinations, sub-combinations, modifications, alterations and/or substitutions of embodiments described herein will become apparent to those skilled in the art. Such combinations, sub-combinations, modifications, alterations and/or substitutions of the embodiments described herein may be used to form one or more additional embodiments without departing from the scope of the present invention.

The present invention was described above with reference to block diagrams of methods, apparatus (systems), components and/or computer program products according to embodiments of the invention. It is understood that a given block of the block diagrams, and combinations of blocks in the block diagrams may be implemented by computer program instructions. These computer program instructions may be provided to a processor of a general purpose computer, special purpose computer, such as a digital signal processor, and/or other programmable data processing apparatus to produce a machine, such that the instructions, which execute via the processor of the computer and/or other programmable data processing apparatus, create means for implementing the functions/acts specified in the block diagrams block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagram block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagram block or blocks.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of controlling a level of interference to a wireless receiver, the method comprising:

determining a set of frequencies to be assigned to a wireless transmitter responsive to an activity factor associated with the wireless transmitter other than a transmission power level of the wireless transmitter; and assigning the set of frequencies to the wireless transmitter, wherein determining a set of frequencies comprises establishing a frequency distance between the set of frequencies and a band of frequencies used for reception by the wireless receiver responsive to the activity factor associated with the wireless transmitter other than the transmission power level of the wireless transmitter, wherein establishing a frequency distance comprises constraining the set of frequencies at a frequency distance from the band of frequencies used for reception by the wireless receiver responsive to the activity factor associated with the wireless transmitter other than the transmission power level of the wireless transmitter, and wherein the wireless receiver is a wireless transceiver that is operative in a Frequency Division Duplex (FDD) mode using a downlink band of frequencies and an uplink band of frequencies and wherein constraining the set of frequencies further comprises constraining the set of frequencies to be proximate to the uplink band of frequencies and distant from the downlink band of frequencies.

2. A method according to claim 1 wherein establishing a frequency distance comprises constraining the set of frequencies at a frequency distance from an edge of a carrier used by the wireless transmitter responsive to the activity factor associated with the wireless transmitter other than the transmission power level of the wireless transmitter.

3. A method according to claim 1 wherein the wireless transmitter is a wireless transceiver that is operative in a Time Division Duplex (TDD) mode.

4. A method according to claim 1 wherein determining comprises increasing a frequency distance between the set of frequencies and a band of frequencies used for reception by the wireless receiver as the activity factor increases.

5. A method according to claim 1 wherein determining comprises decreasing a frequency distance between the set of frequencies and a band of frequencies used for reception by the wireless receiver as the activity factor decreases.

6. A method according to claim 1 wherein determining is further responsive to the wireless transmitter operating indoors or outdoors.

7. A method according to claim 1 wherein the set of frequencies is included in a satellite frequency band.

8. A method according to claim 7 wherein the satellite frequency band is an L-band, S-band, big/little LEO/MEO-band and/or any other band used to provide space-based communications.

9. A method according to claim 1 wherein the band of frequencies used for reception by the wireless receiver is included in a satellite frequency band.

10. A method according to claim 9 wherein the satellite frequency band is an L-band, S-band, big/little LEO/MEO-band and/or any other band used to provide space-based communications.

11. A method according to claim 1 wherein determining further comprises determining the activity factor.

12. A method according to claim 11 wherein the activity factor comprises a bandwidth.

13. A method according to claim 11 wherein the activity factor comprises a duty factor.

14. A method according to Claim 1 wherein determining is further responsive to detecting a signal from the wireless transceiver.

15. A method according to claim 14 wherein the detecting is performed by a base station serving the wireless transmitter.

16. A method according to claim 1 wherein determining is further responsive to a geographic location of the wireless transmitter.

17. A method according to claim 16 wherein the geographic location comprises an identification of a base station that is serving the wireless transmitter.

18. A method according to claim 16 wherein the geographic location comprises a distance of the wireless transmitter relative to a geographic feature.

19. A method according to claim 18 wherein the geographic feature comprises a body of water, an airport and/or an area that is designated as a helicopter landing pad.

20. A method according to claim 1 wherein determining is performed repeatedly.

21. A method according to claim 1 wherein determining is further responsive to establishing that the wireless receiver is proximate to the wireless transmitter.

22. A method according to claim 21 wherein the wireless receiver is a wireless transceiver and wherein establishing comprises detecting a transmission by the wireless transceiver at a base station that serves the wireless transmitter.

23. A method according to claim 21 wherein establishing comprises comparing geographic coordinates associated with the wireless transmitter and the wireless receiver.

24. A method according to claim 1 wherein determining is performed independent of whether the wireless receiver is operating.

25. A method according to claim 1 wherein determining is performed in response to an instruction that is received from a space-based component, an ancillary terrestrial component and/or any other infrastructure component.

26. A method according to claim 1 wherein determining is performed for each one of a plurality of wireless transmitters.

27. A method according to claim 1 wherein determining is performed for a subset of a plurality of wireless transmitters.

28. A method according to claim 1 wherein determining comprises determining a set of frequencies to be assigned to a wireless transmitter responsive to an activity factor associated with the wireless transmitter other than the transmission power level of the wireless transmitter, and further responsive to the transmission power level of the wireless transmitter.

29. A system for controlling a level of interference to a wireless receiver, the system comprising:

a controller that is configured to determine a set of frequencies to be assigned to a wireless transmitter responsive to an activity factor associated with the wireless transmitter other than a transmission power level of the wireless transmitter, wherein the controller is configured to establish a frequency distance between the set of frequencies and a band of frequencies used for reception by the wireless receiver responsive to the activity factor associated with the wireless transmitter other than the transmission power level of the wireless transmitter, wherein the controller is configured to constrain the set of frequencies at a frequency distance from the band of frequencies used for reception by the wireless receiver responsive to the activity factor associated with the wireless transmitter other than the transmission power level of the wireless transmitter, and wherein the wireless receiver is a wireless transceiver that is operative in a Frequency Division Duplex (FDD) mode using a downlink band of frequencies and an uplink band of frequencies and wherein the controller is further configured to constrain the set of frequencies to be proximate to the uplink band of frequencies and distant from the downlink of frequencies.

30. A system according to claim 29 wherein the controller is configured to constrain the set of frequencies at a frequency distance from an edge of a carrier used by the wireless transmitter responsive to the activity factor associated with the wireless transmitter other than the transmission power level of the wireless transmitter.

31. A system according to claim 30 wherein the controller is configured to decrease a frequency distance between the set of frequencies and a band of frequencies used for reception by the wireless receiver as the activity factor decreases.

32. A system according to claim 29 wherein the wireless transmitter is a wireless transceiver that is operative in a Time Division Duplex (TDD) mode.

33. A system according to claim 29 wherein the controller is configured to increase a frequency distance between the set of frequencies and a band of frequencies used for reception by the wireless receiver as the activity factor increases.

34. A system according to claim 29 wherein the controller is further configured to determine the set of frequencies responsive to the wireless transmitter operating indoors or outdoors.

35. A system according to claim 29 wherein the set of frequencies is included in a satellite frequency band.

36. A system according to claim 35 wherein the satellite frequency band is an L-band, S-band, big/little LEO/MEO-band and/or any other band used to provide space-based communications.

37. A system according to claim 29 wherein the band of frequencies used for reception by the wireless receiver is included in a satellite frequency band.

38. A system according to claim 37 wherein the satellite frequency band is an L-band, S-band, big/little LEO/MEO-band and/or any other band used to provide space-based communications.

39. A system according to claim 29 wherein the controller is further configured to determine the activity factor.

40. A system according to claim 39 wherein the activity factor comprises a bandwidth.

41. A system according to claim 39 wherein the activity factor comprises a duty factor.

42. A system according to claim 29 wherein the controller is further configured to determine the set of frequencies responsive to a detection of a signal from the wireless transceiver.

43. A system according to claim 42 wherein the detection is performed by a base station serving the wireless transmitter.

44. A system according to claim 29 wherein the controller is further configured to determine the set of frequencies responsive to a geographic location of the wireless transmitter.

45. A system according to claim 44 wherein the geographic location comprises an identification of a base station that is serving the wireless transmitter.

46. A system according to claim 44 wherein the geographic location comprises a distance of the wireless transmitter relative to a geographic feature.

47. A system according to claim 46 wherein the geographic feature comprises a body of water, an airport and/or an area that is designated as a helicopter landing pad.

48. A system according to claim 29 wherein the controller is configured to determine a set of frequencies repeatedly.

49. A system according to claim 29 wherein the controller is further configured to determine the set of frequencies responsive to the wireless receiver being proximate to the wireless transmitter.

50. A system according to claim 49 wherein the wireless receiver is a wireless transceiver and wherein the wireless receiver being proximate to the wireless transmitter is determined by detecting a transmission by the wireless transceiver at a base station that serves the wireless transmitter.

51. A system according to claim 49 wherein the wireless receiver being proximate to the wireless transmitter is determined by comparing geographic coordinates associated with the wireless transmitter and the wireless receiver.

52. A system according to claim 29 wherein the controller is configured to determine the set of frequencies independent of whether the wireless receiver is operating.

53. A system according to claim 29 wherein the controller is located at a space-based component, an ancillary terrestrial component and/or any other infrastructure component.

54. A system according to claim 29 wherein the controller is configured to determine a set of frequencies for each one of a plurality of wireless transmitters.

55. A system according to claim 29 wherein the controller is configured to determine a set of frequencies for each one of a subset of wireless transmitters; wherein the subset of wireless transmitters is included in a plurality of wireless transmitters.

56. A system according to claim 29 wherein the controller is configured to determine the set of frequencies to be assigned to the wireless transmitter responsive to the activity factor associated with the wireless transmitter other than the transmission power level of the wireless transmitter and further responsive to the transmission power level of the wireless transmitter.

* * * * *